(12) United States Patent  
Liu et al.

(10) Patent No.: US 12,389,490 B2
(45) Date of Patent: Aug. 12, 2025

(54) CONFIGURATION ENABLING METHOD AND APPARATUS

(71) Applicant: HUAWEI TECHNOLOGIES CO., LTD., Guangdong (CN)

(72) Inventors: Jun Liu, Beijing (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 513 days.

(21) Appl. No.: 17/869,882

(22) Filed: Jul. 21, 2022

(65) Prior Publication Data
US 2022/0361283 A1 Nov. 10, 2022

Related U.S. Application Data

(63) Continuation of application No. PCT/CN2021/072700, filed on Jan. 19, 2021.

(30) Foreign Application Priority Data

Jan. 22, 2020 (CN) .......................... 202010075658.4
Aug. 21, 2020 (CN) .......................... 202010851968.0

(51) Int. Cl.
*H04W 76/28* (2018.01)
*H04W 52/02* (2009.01)
*H04W 92/18* (2009.01)

(52) U.S. Cl.
CPC ....... *H04W 76/28* (2018.02); *H04W 52/0235* (2013.01); *H04W 92/18* (2013.01)

(58) Field of Classification Search
CPC ......... H04W 72/02; H04W 4/40; H04W 4/70; H04W 72/20; H04W 72/25; H04W 72/40;
(Continued)

(56) References Cited

U.S. PATENT DOCUMENTS 12,095,566 B2 * 9/2024 Hwang ................. H04L 1/1812
2019/0053305 A1 2/2019 Saiwai et al.
(Continued)

FOREIGN PATENT DOCUMENTS

CN 105589506 A 5/2016
CN 109479189 A 3/2019
(Continued)

OTHER PUBLICATIONS

Extended European Search Report for Application No. 21743820 dated May 22, 2023, 7 pages.
(Continued)

*Primary Examiner* — Joseph Arevalo

(57) ABSTRACT

This application provides a configuration enabling method and an apparatus. The method includes: A first terminal device determines first indication information, where the first indication information indicates an enabling operation determined for a first sidelink, the enabling operation includes enabling a sidelink discontinuous reception SL DRX configuration for the first sidelink, or disabling an SL DRX configuration for the first sidelink, and the first sidelink is a sidelink between the first terminal device and a second terminal device. The first terminal device sends the first indication information to the second terminal device. According to the method provided in this application, the first terminal device introduces an SL DRX configuration enabling mechanism based on a status or a requirement of the second terminal device. This improves user experience.

17 Claims, 5 Drawing Sheets

(58) Field of Classification Search
CPC . H04W 74/0808; H04W 76/28; H04W 72/04; H04W 74/002; H04W 74/0833; H04W 74/0836; H04W 74/0838; H04W 24/10; H04W 28/04; H04W 56/00; H04W 72/542; H04W 74/08
USPC .................................. 370/318, 329, 252, 350
See application file for complete search history.

(56) References Cited

U.S. PATENT DOCUMENTS

| | | | |
|---|---|---|---|
| 2020/0413295 A1* | 12/2020 | Li | H04W 72/53 |
| 2021/0274559 A1* | 9/2021 | Hwang | H04W 74/0833 |
| 2022/0183005 A1* | 6/2022 | Lu | H04W 72/0446 |
| 2022/0416976 A1* | 12/2022 | Baek | H04W 72/51 |
| 2023/0101824 A1* | 3/2023 | Baek | H04W 4/40 |
| | | | 455/522 |
| 2023/0199804 A1* | 6/2023 | Hwang | H04W 72/25 |
| 2024/0049260 A1* | 2/2024 | Li | H04L 5/0048 |
| 2024/0129901 A1* | 4/2024 | Su | H04W 72/044 |
| 2024/0163902 A1* | 5/2024 | Hwang | H04J 11/0069 |
| 2024/0188099 A1* | 6/2024 | Hwang | H04W 72/0453 |
| 2024/0224302 A1* | 7/2024 | Li | H04L 5/0094 |
| 2024/0340927 A1* | 10/2024 | Liu | H04L 5/0048 |

FOREIGN PATENT DOCUMENTS

| | | |
|---|---|---|
| WO | 2014092612 A1 | 6/2014 |
| WO | 2016180463 A1 | 11/2016 |
| WO | 2018064477 A1 | 4/2018 |

OTHER PUBLICATIONS

RP-192745, LG Electronics, Summary of email discussion on Rel-17 sidelink enhancement, 3GPP TSG RAN #86, Sitges, ES, Dec. 9-12, 2019, 27 pages.
PCT International Search Report for Application No. PCT/CN2021/072700 dated Jan. 19, 2021, 11 pages.

* cited by examiner

CONFIGURATION ENABLING METHOD AND APPARATUS

CROSS-REFERENCE TO RELATED APPLICATIONS

This application is a continuation of International Application No. PCT/CN2021/072700, filed on Jan. 19, 2021, which claims priority to Chinese Patent Application No. 202010075658.4, filed on Jan. 22, 2020 and Chinese Patent Application No. 202010851968.0, filed on Aug. 21, 2020. All of the aforementioned patent applications are hereby incorporated by reference in their entireties.

TECHNICAL FIELD

This application relates to the field of communication technologies, and in particular, to a configuration enabling method and an apparatus.

BACKGROUND

Vehicle to everything (V2X) is generally a communication network providing vehicle information by using a sensor, a vehicle-mounted terminal device, or the like that is mounted on a vehicle, to implement vehicle to vehicle (V2V), vehicle to infrastructure (V2I), vehicle to network (V2N), and vehicle to pedestrian (V2P) communication. Generally, in a V2X scenario, a communication link used for direct communication between a terminal device and another terminal device may be referred to as a side link or a sidelink (SL). An SL interface may be referred to as a PC5 interface, and the terminal device may include a PC5 interface of a communication system such as an LTE standard system or an NR standard system. A wireless communication link between the terminal device and a network device may be referred to as an uplink (UL) or a downlink (DL). Because a UL or DL interface may be referred to as a Uu interface, the UL or the DL may be referred to as a Uu interface link. The terminal device may include a Uu interface of a communication system such as an LTE standard system or an NR standard system.

In a wireless communication system, a discontinuous reception (DRX) mechanism is introduced to control behavior of monitoring a physical downlink control channel (PDCCH) by a terminal device, to reduce power consumption of the terminal device. However, on the SL link between the terminal device and the another terminal device, reducing power consumption of the terminal device while ensuring effective data transmission becomes an urgent problem to be resolved.

SUMMARY

Embodiments of this application provide a configuration enabling method and an apparatus. A discontinuous reception (sidelink discontinuous reception, SL DRX) configuration enabling mechanism on a side link is considered, and an SL DRX configuration is determined based on a status or a requirement of a terminal device, to reduce power consumption of the terminal device while ensuring effective data transmission.

According to a first aspect, an embodiment of this application provides a configuration enabling method. The method includes: First, a first terminal device determines first indication information, where the first indication information indicates an enabling operation determined for a first sidelink, the enabling operation includes enabling a sidelink discontinuous reception SL DRX configuration for the first sidelink, or disabling an SL DRX configuration for the first sidelink, and the first sidelink is a sidelink between the first terminal device and a second terminal device. Then, the first terminal device sends the first indication information to the second terminal device. Therefore, the first terminal device introduces a DRX enabling mechanism by indicating, to the second terminal device, whether to enable the SL DRX configuration. This increases efficiency of the DRX configuration for the first sidelink, and improves user experience.

Optionally, the first terminal device is a terminal device at a transmit end, the second terminal device is a receive device, and the first terminal device is connected to a network device.

In a possible implementation, the communication method further includes: The first terminal device receives first auxiliary information sent by the second terminal device, where the first auxiliary information includes one or more of power percentage information, a power level, sufficient power indication information, power saving type information of a terminal device, SL DRX adjustment value information with null content, indication information for enabling or disabling an SL DRX configuration, and resource configuration information that are of the second terminal device. The first terminal device determines the first indication information based on the first auxiliary information.

In the foregoing implementation, the first terminal device determines, based on the received first auxiliary information, whether to enable the SL DRX configuration, to be specific, determines, based on a status or a requirement of the second terminal device, whether to enable the SL DRX configuration for the first sidelink.

Optionally, the communication method further includes: The first terminal device sends first auxiliary feedback indication information to the second terminal device, where the first auxiliary feedback indication information indicates the second terminal device to send auxiliary information related to the SL DRX configuration to the first terminal device. Optionally, the first auxiliary feedback indication information indicates the second terminal device to send the first auxiliary information to the first terminal device. Herein, the first terminal device indicates the second terminal to feed back the status or the requirement of the second terminal.

Optionally, the first auxiliary feedback indication is carried in a sidelink control (sidelink control information, SCI) message, a media access control control element (MAC CE) message, or a PC5-radio resource control (RRC) message.

In a possible implementation, the communication method further includes: The first terminal device determines the first indication information based on fourth service-related information, where the fourth service-related information is service-related information between the first terminal device and the second terminal device. For example, the fourth service-related information may be a service cycle, a service volume in a specific time period, service duration, information related to quality of service (QoS), or the like.

In the foregoing implementation, the first terminal device may determine, based on service information on the first sidelink, whether to enable the SL DRX configuration. This improves user experience.

In a possible implementation, the communication method further includes: The first terminal device sends first enabling indication information to the second terminal device, where the first enabling indication information indicates to enable the SL DRX configuration for the first sidelink.

Optionally, the first enabling indication information is carried in SCI, a MAC CE, or a PC5-RRC message.

In a possible implementation, the communication method further includes: The first terminal device sends first disabling indication information to the second terminal device, where the first disabling indication information indicates to disable the SL DRX configuration for the first sidelink.

Optionally, the first disabling indication information further includes first SL DRX configuration release indication information, and the second terminal device releases the SL DRX configuration for the first sidelink based on the first SL DRX configuration release indication information.

Optionally, the first disabling indication information is carried in SCI, a media access control control element MAC CE, or a PC5-radio resource control RRC message. Herein, there is a flexible method for carrying the first disabling indication information.

Optionally, the first indication information further includes an identifier of a sidelink, an identifier of a single communication device, or an identifier of a communication device pair. The identifier of the sidelink includes a sidelink connection identifier (sidelink connection ID) or a link identifier of a sidelink (SL link identifier or PC5 link identifier). To be specific, the first indication information may further include an identifier of the first sidelink, or an identifier of a first communication device (the first terminal device), or an identifier of a second communication device (the second terminal device), or the identifier of the communication device pair (a terminal device pair), namely, the identifier of the terminal device pair including the first terminal device and the second terminal device. In this implementation, a sidelink corresponding to the indication information or a terminal device corresponding to the indication information may be identified, to facilitate a correspondence between indication information and a sidelink.

It may be understood that in this application, a sidelink may alternatively be a PC5. A user equipment power saving signal may be another power saving signal such as a DCP (DCI scrambled by PS-RNTI (power saving radio network temporary identity)), a wake up signal (WUS), or a GTS (go-to-sleep signal).

Optionally, the communication method further includes synchronization indication information, where the synchronization indication information indicates to synchronously enable or disable an SL UPSS configuration and the SL DRX configuration. Optionally, the first indication information and SL UPSS enabling indication information are simultaneously sent. The synchronization indication information may be included in the first indication information, or may be sent independently. In other words, the synchronization indication information and the first indication information may be one piece of information, or may be sent simultaneously in a plurality of pieces of information.

According to a second aspect, a configuration enabling method is provided. The method includes: A second terminal device receives first indication information sent by a first terminal device, where the first indication information indicates an enabling operation selected for a first sidelink, the enabling operation includes enabling a sidelink discontinuous reception SL DRX configuration for the first sidelink, or disabling an SL DRX configuration for the first sidelink, and the first sidelink is a sidelink between the first terminal device and the second terminal device. The second terminal device determines, based on the first indication information, the enabling operation for the first sidelink. The second terminal device receives the first indication information from the first terminal device, and obtains whether the first terminal device enables the SL DRX configuration for the first sidelink, to ensure that the enabling for the first sidelink is consistent with enabling for the first terminal device.

In a possible implementation, the communication method further includes: The second terminal device sends first auxiliary information to the first terminal device, where the first auxiliary information includes one or more of power percentage information, a power level, sufficient power indication information, power saving type information of a terminal device, a recommended SL DRX configuration, SL DRX adjustment value information with null content, indication information for enabling or disabling an SL DRX configuration, and resource configuration information that are of the second terminal device. The second terminal device provides the first terminal device with the auxiliary information related to the SL DRX configuration, so that the first terminal device determines, for the first sidelink based on the auxiliary information related to the SL DRX configuration, whether to enable the SL DRX configuration. This improves SL DRX configuration efficiency. Herein, the second terminal device feeds back a status or a requirement to the first terminal device, to provide a reference for the first terminal device to determine the first indication information.

In a possible implementation, the communication method further includes: The second terminal device receives first auxiliary feedback indication information, where the first auxiliary feedback indication information indicates the second terminal device to send the auxiliary information related to the SL DRX configuration to the first terminal device. Optionally, the first auxiliary feedback indication information indicates the second terminal device to send the first auxiliary information to the first terminal device.

Optionally, the second terminal device receives the first auxiliary feedback indication information sent by the first terminal device, or the second terminal device receives the first auxiliary feedback indication information sent by a network device. The second terminal device determines, based on the first auxiliary feedback indication information, to send the first auxiliary information to the first terminal device.

In the foregoing implementation, the first auxiliary feedback indication information is received, to trigger sending of the first auxiliary information to the first terminal device, to provide a reference for the first terminal device to determine the first indication information.

In a possible implementation, the communication method further includes: The second terminal device determines, based on the auxiliary information related to the SL DRX configuration, to send the first auxiliary information to the first terminal device, where the auxiliary information related to the SL DRX configuration is auxiliary reference information related to the SL DRX configuration.

Optionally, when the second terminal device sends the first auxiliary information to the first terminal device once, the second terminal device starts a timer T1.

Optionally, the second terminal device sends the first auxiliary information to the first terminal device when one or more of the following conditions are met:

One or more values in current SL DRX-related auxiliary information of the second terminal device are different from a value of a corresponding item in SL DRX-related auxiliary information fed back previously, a difference between the one or more values and the value of the corresponding item exceeds a preset threshold, the timer T1 is not running, power is sufficient and current SL DRX is effective, or the power is insufficient or the power is excessively low and the current SL DRX is not effective.

The second terminal device triggers, based on the auxiliary information related to the SL DRX configuration, sending of the first auxiliary information to the first terminal device, to provide a reference for the first terminal device to determine the first indication information.

In a possible implementation, that a second terminal device receives first indication information sent by a first terminal device includes: The second terminal device receives first enabling indication information sent by the first terminal device, where the first enabling indication information indicates to enable the SL DRX configuration for the first sidelink.

Optionally, the first enabling indication information is carried in SCI, a MAC CE, or a PC5-RRC message.

In a possible implementation, that a second terminal device receives first indication information sent by a first terminal device includes: The second terminal device receives first disabling indication information sent by the first terminal device, where the first disabling indication information indicates to disable the SL DRX configuration for the first sidelink.

Optionally, the first disabling indication information further includes first SL DRX configuration release indication information, and the second terminal device releases the SL DRX configuration for the first sidelink based on the first SL DRX configuration release indication information.

Optionally, the first disabling indication information is carried in SCI, a MAC CE, or a PC5-RRC message.

According to a third aspect, a configuration enabling method is provided. The method includes: A network device determines second indication information, where the second indication information indicates an enabling operation determined for a first sidelink, the enabling operation includes enabling an SL DRX configuration for the first sidelink, or disabling an SL DRX configuration for the first sidelink, and the first sidelink is a sidelink between a first terminal device and a second terminal device. The network device sends the second indication information to the first terminal device.

According to the foregoing method, the network device determines the enabling operation of the SL DRX configuration for the sidelink between the first terminal device and the second terminal device. This improves SL DRX configuration efficiency and user experience.

In a possible implementation, the communication method further includes: The network device receives first service-related information sent by the first terminal device, where the first service-related information is service-related information between the first terminal device and the second terminal device. The network device determines the second indication information based on the first service-related information. For example, the first service-related information may include a service cycle, a service volume in a specific time period, service duration, or the like.

Optionally, the communication method further includes: The network device sends first service-related feedback indication information to the first terminal device, where the first service-related feedback indication information indicates to send the first service-related information to the network device.

In a possible implementation, the communication method further includes: The network device receives second auxiliary information sent by the first terminal device, where the second auxiliary information includes one or more of power percentage information, a power level, sufficient power indication information, power saving type information of a terminal device, a recommended SL DRX configuration, SL DRX adjustment value information with null content, indication information for enabling or disabling an SL DRX configuration, and resource configuration information that are of the second terminal device. The network device determines the second indication information based on the second auxiliary information.

Optionally, the communication method further includes: The network device sends second auxiliary feedback indication information to the first terminal device, where the second auxiliary feedback indication information indicates to send the second auxiliary information to the network device.

In the foregoing implementation, the network device determines, based on the service-related information between the first terminal device and the second terminal device and the auxiliary information of the second terminal device. In other words, the network device determines, based on statuses of the first terminal device and the second terminal device, the enabling operation of the SL DRX configuration for the sidelink between the first terminal device and the second terminal device. This improves SL DRX configuration efficiency and user experience.

In a possible implementation, the communication method further includes: The network device sends second auxiliary feedback indication information to the first terminal device, where the second auxiliary feedback indication information indicates the first terminal device to send SL DRX-related auxiliary information to the network device.

In a possible implementation, that the network device sends the second indication information to the first terminal device includes: The network device sends second enabling indication information to the first terminal device, where the second enabling indication information indicates to enable the SL DRX configuration for the first sidelink.

Optionally, the second enabling indication information is carried in a downlink control (downlink control information, DCI) message, a MAC CE message, or an RRC message.

In a possible implementation, that the network device sends the second indication information to the first terminal device includes: The network device sends second disabling indication information to the first terminal device, where the second enabling indication information indicates to disable the SL DRX configuration for the first sidelink.

Optionally, the second disabling indication information further includes second SL DRX configuration release indication information, and the second SL DRX configuration release indication information indicates to release the SL DRX configuration for the first sidelink.

Optionally, the second disabling indication information is carried in a DCI message, a MAC CE message, or an RRC message.

Optionally, the second indication information is SL DRX configuration information, or the second indication information is included in the SL DRX configuration information.

Optionally, the second indication information further includes an identifier of a sidelink, an identifier of a single communication device, or an identifier of a communication device pair. To be specific, the second indication information may further include an identifier of the first sidelink, or an identifier of a first communication device (the first terminal device), or an identifier of a second communication device (the second terminal device), or the identifier of the communication device pair (a terminal device pair), namely, the identifier of the terminal device pair including the first terminal device and the second terminal device. In this implementation, a sidelink corresponding to the indication information or a terminal device corresponding to the indication information may be identified, to facilitate a correspondence between indication information and a sidelink.

According to a fourth aspect, a configuration enabling method is provided. The method includes: A first terminal device receives second indication information sent by a network device, where the second indication information indicates an enabling operation determined for a first sidelink, the enabling operation includes enabling an SL DRX configuration for the first sidelink, or disabling an SL DRX configuration for the first sidelink, and the first sidelink is a sidelink between the first terminal device and a second terminal device. The first terminal device sends the second indication information to the second terminal device.

According to the foregoing method, after receiving the indication information that is sent by the network device and that is of the enabling operation determined for the first sidelink, the first terminal device sends the indication information to the second terminal device, so that the second terminal device obtains content of the indication information. This improves DRX configuration efficiency.

In a possible implementation, the communication method further includes: The first terminal device sends first service-related information to the network device, where the first service-related information is service-related information between the first terminal device and the second terminal device. For example, the first service-related information may include a service cycle, a service volume in a specific time period, service duration, or the like.

Optionally, the communication method further includes: The first terminal device receives first service-related feedback indication information sent by the network device, where the first service-related feedback indication information indicates to send the first service-related information to the network device.

In a possible implementation, the communication method further includes: The first terminal device receives second auxiliary information sent by the second terminal device, where the second auxiliary information includes one or more of power percentage information, a power level, sufficient power indication information, power saving type information of a terminal device, a recommended SL DRX configuration, SL DRX adjustment value information with null content, indication information for enabling or disabling an SL DRX configuration, and resource configuration information that are of the second terminal device. The first terminal device sends the second auxiliary information to the network device.

In a possible implementation, the communication method further includes: The first terminal device sends second auxiliary feedback indication information to the second terminal device, where the second auxiliary feedback indication information indicates the second terminal device to send the second auxiliary information.

In the foregoing implementation, the first terminal device feeds back statuses of the first terminal device and the second terminal device and a power consumption reduction requirement to the network device by using the first service-related information and/or the second auxiliary information.

In a possible implementation, that a first terminal device receives second indication information sent by a network device includes: The first terminal device receives second enabling indication information sent by the network device, where the second enabling indication information indicates to enable the SL DRX configuration for the first sidelink.

Optionally, the second enabling indication information is carried in a DCI message, a MAC CE message, or an RRC message.

In a possible implementation, that a first terminal device receives second indication information sent by a network device includes: The first terminal device receives second disabling indication information sent by the network device, where the second disabling indication information indicates to disable the SL DRX configuration for the first sidelink.

Optionally, the second disabling indication information further includes second SL DRX configuration release indication information, and the second SL DRX configuration release indication information indicates to release the SL DRX configuration for the first sidelink.

Optionally, the second disabling indication information is carried in a DCI message, a MAC CE message, or an RRC message.

Optionally, the communication method further includes synchronization indication information, where the synchronization indication information indicates to synchronously enable or disable an SL UPSS configuration and the SL DRX configuration. Optionally, the second indication information and SL UPSS enabling indication information are simultaneously sent. The synchronization indication information may be included in the second indication information, or may be sent independently. In other words, the synchronization indication information and the second indication information may be one piece of information, or may be sent simultaneously in a plurality of pieces of information.

According to a fifth aspect, a configuration enabling method is provided. The method includes: A second terminal device receives second indication information sent by a first terminal device, where the second indication information indicates an enabling operation determined for a first sidelink, the enabling operation includes enabling an SL DRX configuration for the first sidelink, or disabling an SL DRX configuration for the first sidelink, and the first sidelink is a sidelink between the first terminal device and the second terminal device. The second terminal device determines, based on the second indication information, the enabling operation for the first sidelink.

According to the foregoing method, the second terminal device determines the enabling operation for the first sidelink based on the indication information that is sent by the first terminal device and that indicates the enabling operation of the SL DRX configuration determined for the first sidelink, so that the first terminal device and the second terminal device align information about the SL DRX configuration.

In a possible implementation, the communication method further includes: The second terminal device sends second auxiliary information to the first terminal device, where the second auxiliary information includes one or more of power percentage information, a power level, sufficient power indication information, power saving type information of a terminal device, a recommended SL DRX configuration, SL DRX adjustment value information with null content, indication information for enabling or disabling an SL DRX configuration, and resource configuration information that are of the second terminal device. The second terminal device provides the first terminal device with the auxiliary information related to the SL DRX configuration, so that the first terminal device determines, for the first sidelink based on the auxiliary information related to the SL DRX configuration, whether to enable the SL DRX configuration. This improves SL DRX configuration efficiency.

In a possible implementation, the communication method further includes: The second terminal device receives second auxiliary feedback indication information, where the second auxiliary feedback indication information indicates the second terminal device to send the auxiliary information related to the SL DRX configuration to the first terminal device.

Optionally, the second terminal device receives the second auxiliary feedback indication information sent by the first terminal device, or the second terminal device receives the second auxiliary feedback indication information sent by a network device.

In the foregoing implementation, the second auxiliary feedback indication information is received, to trigger sending of the second auxiliary information to the first terminal device, to provide a reference for the first terminal device to determine the second indication information.

In a possible implementation, the communication method further includes: The second terminal device determines, based on the auxiliary information related to the SL DRX configuration, to send the second auxiliary information to the first terminal device, where the auxiliary information related to the SL DRX configuration is auxiliary reference information related to the SL DRX configuration.

Optionally, when sending the second auxiliary information to the first terminal device, the second terminal device starts a timer T2.

Optionally, the second terminal device sends the second auxiliary information to the first terminal device when one or more of the following conditions are met:

One or more values in current SL DRX-related auxiliary information of the second terminal device are different from a value of a corresponding item in SL DRX-related auxiliary information fed back previously, a difference between the one or more values and the value of the corresponding item exceeds a preset threshold, the timer T2 is not running, power is sufficient and current SL DRX is effective, or the power is insufficient or the power is excessively low and the current SL DRX is not effective.

In the foregoing implementation, the second terminal device triggers, based on the auxiliary information related to the SL DRX configuration, sending of the second auxiliary information to the first terminal device, to provide a reference for the first terminal device to determine the second indication information.

In a possible implementation, that a second terminal device receives second indication information sent by a first terminal device includes: The second terminal device receives second enabling indication information sent by the first terminal device, where the second enabling indication information indicates to enable the SL DRX configuration for the first sidelink.

Optionally, the second enabling indication information is carried in SCI, a MAC CE, or a PC5-RRC message.

In a possible implementation, that a second terminal device receives second indication information sent by a first terminal device includes: The second terminal device receives second disabling indication information sent by the first terminal device, where the second disabling indication information indicates to disable the SL DRX configuration for the first sidelink.

Optionally, the second disabling indication information further includes second SL DRX configuration release indication information, and the second terminal device releases the SL DRX configuration for the first sidelink based on the second SL DRX configuration release indication information.

Optionally, the second disabling indication information is carried in SCI, a MAC CE, or a PC5-RRC message.

According to a sixth aspect, a configuration enabling method is provided. The method includes: A second terminal device determines third indication information, where the third indication information indicates an enabling operation determined for a first sidelink, the enabling operation includes enabling a sidelink discontinuous reception SL DRX configuration for the first sidelink, or disabling an SL DRX configuration for the first sidelink, and the first sidelink is a sidelink between a first terminal device and the second terminal device. The second terminal device sends the third indication information to the first terminal device.

According to the foregoing method, the second terminal device sends the third indication information to the first terminal after determining the enabling operation for the first sidelink, so that enabling of SL DRX configurations of the first terminal device and the second terminal device are consistent.

In a possible implementation, the communication method further includes: The second terminal device receives third auxiliary information sent by the first terminal device, where the third auxiliary information includes one or more of the following information: service-related information and resource configuration information that are between the first terminal device and the second terminal device. The second terminal device determines the third indication information based on the third auxiliary information. In a possible implementation, the communication method further includes: The second terminal device determines the third indication information based on service-related information of the second terminal device, where the service-related information of the second terminal device includes a requirement for sending a service.

In a possible implementation, that the second terminal device sends the third indication information to the first terminal device includes: The second terminal device sends third enabling indication information to the first terminal device, where the third enabling indication information indicates to enable the SL DRX configuration for the first sidelink.

In a possible implementation, that the second terminal device sends the third indication information to the first terminal device includes: The second terminal device sends third disabling indication information to the first terminal device, where the third disabling indication information indicates to disable the SL DRX configuration for the first sidelink.

Optionally, the third disabling indication information further includes third SL DRX configuration release indication information, and the third SL DRX configuration release indication information indicates to release the SL DRX configuration for the first sidelink.

Optionally, the third indication information further includes an identifier of a sidelink, an identifier of a single communication device, or an identifier of a communication device pair. To be specific, the third indication information may further include an identifier of the first sidelink, or an identifier of a first communication device (the first terminal device), or an identifier of a second communication device (the second terminal device), or the identifier of the communication device pair (a terminal device pair), namely, the identifier of the terminal device pair including the first terminal device and the second terminal device. In this implementation, a sidelink corresponding to the indication information or a terminal device corresponding to the indication information may be identified, to facilitate a correspondence between indication information and a sidelink.

Optionally, the communication method further includes synchronization indication information, where the synchronization indication information indicates to synchronously enable or disable an SL UPSS configuration and the SL DRX configuration. Optionally, the third indication information and SL UPSS enabling indication information are simultaneously sent. The synchronization indication information may be included in the third indication information, or may be sent independently. In other words, the synchronization indication information and the third indication information may be one piece of information, or may be sent simultaneously in a plurality of pieces of information.

According to a seventh aspect, a configuration enabling method is provided. The method includes: A first terminal device receives third indication information sent by a second terminal device, where the third indication information indicates an enabling operation determined for a first sidelink, the enabling operation includes enabling a sidelink discontinuous reception SL DRX configuration for the first sidelink, or disabling an SL DRX configuration for the first sidelink, and the first sidelink is a sidelink between a first terminal device and the second terminal device. The first terminal device determines the enabling operation for the first sidelink based on the third indication information.

According to the foregoing method, the first terminal device keeps consistent enabling of SL DRX of the first terminal device with that of the second terminal device based on the received third indication information.

In a possible implementation, the communication method further includes: The first terminal device sends third auxiliary related information to the second terminal device, where the third auxiliary information includes one or more of the following information: service-related information and resource configuration information that are between the first terminal device and the second terminal device.

In a possible implementation, that a first terminal device receives third indication information sent by a second terminal device includes: The first terminal device receives third enabling indication information sent by the second terminal device, where the third enabling indication information indicates to enable the SL DRX configuration for the first sidelink.

In a possible implementation, that a first terminal device receives third indication information sent by a second terminal device includes: The first terminal device receives third disabling indication information sent by the second terminal device, where the third disabling indication information indicates to disable the SL DRX configuration for the first sidelink.

Optionally, the third disabling indication information further includes third SL DRX configuration release indication information, and the third SL DRX configuration release indication information indicates to release the SL DRX configuration for the first sidelink.

According to an eighth aspect, a configuration enabling method is provided. The method includes: A second terminal device determines first information, where the first information includes SL DRX cycle adjustment indication information, the SL DRX cycle adjustment indication information is used to adjust an SL DRX cycle of a first sidelink, and the first sidelink is a sidelink between a first communication device and a second communication device. The second terminal device sends the first information to a first terminal device.

Optionally, the second terminal device determines the first information based on third service-related information, where the first information includes SL DRX cycle adjustment indication information, the SL DRX cycle adjustment indication information is related to a cycle adjustment value and a cycle reference value, and the third service-related information is service-related information of the second terminal device.

Optionally, the first information includes an SL DRX cycle adjustment value and an SL DRX cycle reference value.

Optionally, the first information includes an SL DRX cycle adjustment value.

According to the foregoing method, the first information sent by the second terminal device to the first terminal is used for adjusting the SL DRX cycle. This improves user experience.

According to a ninth aspect, a configuration enabling method is provided. The method includes: A first terminal device receives first information sent by a second terminal device, where the first information includes SL DRX cycle adjustment indication information, the SL DRX cycle adjustment indication information is used to adjust an SL DRX cycle of a first sidelink, and the first sidelink is a sidelink between a first communication device and a second communication device. The first terminal device adjusts the SL DRX cycle based on the first information.

Optionally, the first terminal device receives the first information sent by the second terminal device, where the first information includes the SL DRX cycle adjustment indication information, and the SL DRX cycle adjustment indication information is related to a cycle adjustment value and a cycle reference value.

In a possible implementation, the first information further includes an SL DRX cycle reference value.

Optionally, the first information includes an SL DRX cycle adjustment value and an SL DRX cycle reference value.

Optionally, the first information includes an SL DRX cycle adjustment value.

According to the foregoing method, the first terminal device receives the first information sent by the second terminal, to adjust the SL DRX cycle. This improves user experience.

According to a tenth aspect, a configuration enabling method is provided. The method includes: A first terminal device determines fourth indication information, where the fourth indication information indicates an enabling operation determined for a first sidelink, the enabling operation includes enabling a sidelink user equipment power saving signal SL UPSS configuration for the first sidelink, or disabling an SL UPSS configuration for the first sidelink, and the first sidelink is a sidelink between the first terminal device and a second terminal device. The first terminal device sends the fourth indication information to the second terminal device.

According to the foregoing method, the first terminal device determines the enabling operation of the SL UPSS configuration for the first sidelink. This helps the first terminal device and the second terminal device keep consistent enabling of the SL UPSS configuration.

In a possible implementation, the communication method further includes: The first terminal device receives fourth auxiliary information of the second terminal device, where the fourth auxiliary information includes one or more of power percentage information, a power level, sufficient power indication information, power saving type information of a terminal device, and resource configuration information that are of the second terminal device. The first terminal device determines the fourth indication information based on the fourth auxiliary information.

In a possible implementation, the communication method further includes: The first terminal device sends fourth auxiliary feedback indication information to the second terminal device, where the fourth auxiliary feedback indication information indicates the second terminal device to send the fourth auxiliary information to the first terminal device.

According to the foregoing method, the first terminal device determines, based on a status and/or a requirement of the second terminal device, the enabling operation of the SL UPSS configuration for the first sidelink.

Optionally, the fourth indication information further includes an identifier of a sidelink, an identifier of a single communication device, or an identifier of a communication device pair. To be specific, the fourth indication information may further include an identifier of the first sidelink, or an identifier of a first communication device (the first terminal device), or an identifier of a second communication device (the second terminal device), or the identifier of the communication device pair (a terminal device pair), namely, the identifier of the terminal device pair including the first terminal device and the second terminal device. In this implementation, a sidelink corresponding to the indication information or a terminal device corresponding to the indication information may be identified, to facilitate a correspondence between indication information and a sidelink.

According to an eleventh aspect, a configuration enabling method is provided. The method includes: A second terminal device receives fourth indication information sent by a first terminal device, where the fourth indication information indicates an enabling operation determined for a first sidelink, the enabling operation includes enabling an SL UPSS configuration for the first sidelink or disabling an SL UPSS configuration for the first sidelink, and the first sidelink is a sidelink between the first terminal device and the second terminal device. The second terminal device determines the enabling operation for the first sidelink based on the fourth indication information.

In a possible implementation, the communication method further includes: The second terminal device sends fourth auxiliary information to the first terminal device, where the fourth auxiliary information includes one or more of power percentage information, a power level, sufficient power indication information, power saving type information of a terminal device, and resource configuration information that are of the second terminal device.

In a possible implementation, the communication method further includes: The second terminal device receives fourth auxiliary feedback indication information sent by the first terminal device, where the fourth auxiliary feedback indication information indicates the second terminal device to send the fourth auxiliary information to the first terminal device.

In a possible implementation, the communication method further includes synchronization indication information, where the synchronization indication information indicates to synchronously enable or disable an SL UPSS configuration and the SL DRX configuration. Optionally, the synchronization indication information and the SL DRX enabling indication information are simultaneously sent. The synchronization indication information may be included in SL DRX indication information, or may be sent independently. In other words, the synchronization indication information and the SL DRX indication information may be one piece of information, or may be sent simultaneously in a plurality of pieces of information.

According to a twelfth aspect, a configuration enabling method is provided. The method includes: A network device determines fifth indication information, where the fifth indication information indicates an enabling operation of an SL UPSS configuration, the enabling operation includes enabling the SL UPSS configuration for the first sidelink or disabling the SL UPSS configuration for the first sidelink, and the first sidelink is a sidelink between a first terminal device and a second terminal device. The network device sends the fifth indication information to the first terminal device. For a manner of determining the fifth indication information by the network device, refer to a manner of determining the second indication information by the network device in the third aspect. A difference lies in that the SL DRX configuration is replaced with the SL UPSS configuration.

Optionally, the communication method further includes: The network device receives fifth service-related information sent by the first terminal device, where the fifth service-related information is service-related information between the first terminal device and the second terminal device. The network device determines the fifth indication information based on the fifth service-related information.

Optionally, the communication method further includes: The network device sends fifth service-related feedback indication information to the first terminal, where the fifth service-related feedback indication information indicates to send the fifth service-related information to the network device.

In a possible implementation, the communication method further includes: The network device receives fifth auxiliary information sent by the first terminal device, where the fifth auxiliary information includes one or more of power percentage information, a power level, sufficient power indication information, power saving type information of a terminal device, and resource configuration information that are of the second terminal device. The network device determines the fifth indication information based on the fifth auxiliary information.

Optionally, the communication method further includes: The first terminal device receives fifth auxiliary information sent by the second terminal device. The fifth auxiliary information includes one or more of power percentage information, a power level, sufficient power indication information, power saving type information of a terminal device, and resource configuration information that are of the second terminal device.

Optionally, the communication method further includes synchronization indication information, where the synchronization indication information indicates to synchronously enable or disable an SL UPSS configuration and the SL DRX configuration. Optionally, the fifth indication information and SL DRX enabling indication information are simultaneously sent. The synchronization indication information may be included in the fifth indication information, or may be sent independently. In other words, the synchronization indication information and the fifth indication information may be one piece of information, or may be sent simultaneously in a plurality of pieces of information.

For beneficial effects of the possible designs of the twelfth aspect, refer to descriptions of beneficial effects of the possible designs of the third aspect.

According to a thirteenth aspect, a configuration enabling method is provided. The method includes: A second terminal device determines sixth indication information, where the sixth indication information indicates an enabling operation determined for a first sidelink, the enabling operation includes enabling a sidelink discontinuous reception SL UPSS configuration for the first sidelink, or disabling an SL UPSS configuration for the first sidelink, where the first sidelink is a sidelink between a first terminal device and the second terminal device. The second terminal device sends the sixth indication information to the first terminal device.

In a possible implementation, the communication method further includes: The second terminal device receives sixth auxiliary information sent by the first terminal device, where the sixth auxiliary information includes one or more of the following information: service-related information and resource configuration information that are between the first terminal device and the second terminal device. The second terminal device determines the sixth indication information based on the service-related information and/or the resource configuration information in the sixth auxiliary information.

Optionally, the communication method further includes: The second terminal device sends sixth auxiliary feedback indication information to the first terminal device, where the sixth auxiliary feedback indication information indicates to send the sixth auxiliary information to the second terminal device.

Optionally, the communication method further includes synchronization indication information, where the synchronization indication information indicates to synchronously enable or disable an SL UPSS configuration and the SL DRX configuration. Optionally, the sixth indication information and SL DRX enabling indication information are simultaneously sent. The synchronization indication information may be included in the sixth indication information, or may be sent independently. In other words, the synchronization indication information and the sixth indication information may be one piece of information, or may be sent simultaneously in a plurality of pieces of information.

For a manner of determining the sixth indication information by the second terminal device, refer to a manner of determining the third indication information by the second terminal device in the sixth aspect. A difference lies in that the SL DRX configuration is replaced with the SL UPSS configuration.

For beneficial effects of the possible design in the thirteenth aspect, refer to descriptions of beneficial effects of the possible design in the sixth aspect.

According to a fourteenth aspect, a configuration enabling method is provided. The method includes: A second communication device determines service requirement information, where the service requirement information includes that the second communication device needs to send a service or that the second communication device does not need to send a service. The second communication device determines third indication information based on a service requirement, where the third indication information indicates an enabling operation for a first sidelink, the enabling operation includes enabling a sidelink discontinuous reception SL DRX configuration for the first sidelink, or disabling an SL DRX configuration for the first sidelink, and a first sidelink is a sidelink between the first communication device and a second communication device. In this manner, the second communication device may flexibly determine the third indication information based on a service requirement.

In a possible implementation, when the second communication device determines that the service needs to be sent, the third indication information indicates to disable the SL DRX configuration for the first sidelink. If the determining that a service needs to be sent, the second communication device disables the SL DRX configuration, to ensure sending of the service.

In a possible implementation, the second communication device obtains a resource through random selection in first t time units after determining that the service needs to be sent, where t is an integer or a decimal greater than 0. In this manner, the second communication device can obtain, in a timely manner, the resource used for sending the service. The time unit in this embodiment of this application may be a second, a millisecond, a symbol, a slot, or the like.

In a possible implementation, the second communication device obtains a resource through random selection and starts sensing in first t time units after determining that the service needs to be sent.

In a possible implementation, the second communication device obtains a resource through random selection in first t time units after determining that the service needs to be sent, and determines to obtain or determine the resource based on a sensing result after the t time units end. The sensing includes full sensing (full sensing) or partial sensing (partial sensing). Optionally, the second communication device may start sensing after determining that the service needs to be sent, or may start sensing in a period of time (for example, after several symbols) after determining that the service needs to be sent. In this manner, the resource is obtained through random selection in the t time units, and after the t time units end, the resource is determined to be obtained or determined based on the sensing result. This ensures that the resource used for sending the service can be obtained in a timely manner.

In a possible implementation, the second communication device obtains a resource through random selection and starts sensing in first t time units after determining that the service needs to be sent, and determines to obtain or determine the resource based on a sensing result after the t time units end. The sensing includes full sensing or partial sensing. In this manner, the resource is obtained through random selection in the t time units and sensing is performed simultaneously, and after the t time units end, the resource is determined to be obtained or determined based on the sensing result. This ensures that the resource used for sending the service can be obtained.

In a possible implementation, the second communication device starts sensing when determining that the service needs to be sent. Optionally, before the second communication device obtains a sensing result, the second communication device obtains the resource in a random selection manner, and/or after the second communication device obtains the sensing result, the second communication device obtains or determines the resource based on the sensing result. In this manner, the second communication device can determine a flexible resource obtaining manner, to ensure that the resource used for sending the service can be obtained.

Optionally, that the communication device needs to send a service includes but is not limited to: The communication device is configured to perform SL communication (is configured to perform sidelink communication), the communication device is configured to transmit SL communication (transmit sidelink communication), or the communication device is interested in SL communication, or the communication device is interested in transmitting SL communication (transmit sidelink communication).

According to a fifteenth aspect, a configuration enabling method is provided. The method includes: A second communication device determines service requirement information, where the service requirement information includes that the second communication device needs to send a service or that the second communication device does not need to send a service. When the second communication device determines that the service needs to be sent, the second communication device determines to disable an SL DRX configuration for a first sidelink, where the first sidelink is a sidelink between a first communication device and the second communication device. In this manner, the second communication device may flexibly determine, based on a service requirement, an enabling manner of the SL DRX configuration for first sidelink.

In a possible implementation, the second communication device determines third indication information, where the third indication information indicates an enabling operation for the first sidelink, the enabling operation includes enabling the sidelink discontinuous reception SL DRX configuration for the first sidelink, or disabling the SL DRX configuration for the first sidelink, and the first sidelink is the sidelink between the first communication device and the second communication device. In this manner, the second communication device may flexibly determine the third indication information based on a service requirement.

In a possible manner, when the second communication device determines that the service needs to be sent, the second communication device indicates a lower layer to disable the SL DRX configuration for the first sidelink. That the second communication device determines that the service needs to be sent includes: An upper layer of the second communication device determines that the service needs to be sent. In other words, the upper layer of the second communication device may send the third indication information to the lower layer, to indicate the enabling operation of SL DRX for the first sidelink.

In a possible implementation, when the second communication device determines that the service needs to be sent, the third indication information indicates to disable the SL DRX configuration for the first sidelink. If the determining that a service needs to be sent, the second communication device disables the SL DRX configuration, to ensure sending of the service.

In a possible implementation, the second communication device obtains a resource through random selection in first t time units after determining that the service needs to be sent, where t is an integer or a decimal greater than 0. In this manner, the second communication device can obtain, in a timely manner, the resource used for sending the service. The time unit in this embodiment of this application may be a second, a millisecond, a symbol, a slot, or the like.

In a possible implementation, the second communication device obtains a resource through random selection and starts sensing in first t time units after determining that the service needs to be sent.

In a possible implementation, the second communication device obtains a resource through random selection in first t time units after determining that the service needs to be sent, and determines to obtain or determine the resource based on a sensing result after the t time units end. The sensing includes full sensing or partial sensing. Optionally, the second communication device may start sensing after determining that the service needs to be sent, or may start sensing in a period of time (for example, after several symbols) after determining that the service needs to be sent. In this manner, the resource is obtained through random selection in the t time units, and after the t time units end, the resource is determined to be obtained or determined based on the sensing result. This ensures that the resource used for sending the service can be obtained in a timely manner.

In a possible implementation, the second communication device obtains a resource through random selection and starts sensing in first t time units after determining that the service needs to be sent, and determines to obtain or determine the resource based on a sensing result after the t time units end. The sensing includes full sensing or partial sensing. In this manner, the resource is obtained through random selection in the t time units and sensing is performed simultaneously, and after the t time units end, the resource is determined to be obtained or determined based on the sensing result. This ensures that the resource used for sending the service can be obtained in a timely manner.

In a possible implementation, the second communication device starts sensing when determining that the service needs to be sent. Optionally, before the second communication device obtains a sensing result, the second communication device obtains the resource in a random selection manner, and/or after the second communication device obtains the sensing result, the second communication device obtains or determines the resource based on the sensing result. In this manner, the second communication device can determine a flexible resource obtaining manner, to ensure that the resource used for sending the service can be obtained in a timely manner. This further reduces a delay and improves communication quality.

Optionally, that the communication device needs to send a service includes but is not limited to: The communication device is configured to perform SL communication, the communication device is configured to transmit SL communication, or the communication device is interested in SL communication, or the communication device is interested in transmitting SL communication.

According to a sixteenth aspect, a communication apparatus is provided. The communication apparatus includes a module configured to perform the method in any one of the first aspect to the fifteenth aspect or the possible implementations of the first aspect to the fifteenth aspect.

According to a seventeenth aspect, a communication apparatus is provided, including a processor and an interface circuit. The interface circuit is configured to receive a signal from another communication apparatus different from the communication apparatus and transmit the signal to the processor, or send a signal from the processor to another communication apparatus different from the communication apparatus. The processor is configured to implement the method in any one of the first aspect to the second aspect or the possible implementations of the first aspect to the second aspect by using a logic circuit or by executing code instructions, or configured to implement the method in any one of the fourth aspect to the eleventh aspect or the possible implementations of the fourth aspect to the eleventh aspect, or configured to implement the method in any one of the thirteenth aspect to the fifteenth aspect or the possible implementations of the thirteenth aspect to the fifteenth aspect.

According to an eighteenth aspect, a communication apparatus is provided, including a processor and an interface circuit. The interface circuit is configured to: receive a signal from another communication apparatus other than the communication apparatus and transmit the signal to the processor, or send a signal from the processor to another communication apparatus other than the communication apparatus. The processor is configured to implement the method in any one of the third aspect or the possible implementations of the third aspect by using a logic circuit or by executing code instructions, or to implement the method in any one of the twelfth aspect or the possible implementations of the twelfth aspect.

According to a nineteenth aspect, a computer-readable storage medium is provided, where the computer-readable storage medium stores a computer program or instructions. When the computer program or instructions is or are executed, the method in any one of the first aspect and the second aspect, the fourth aspect to the eleventh aspect, the fifteenth aspect, or the possible implementations thereof is implemented.

According to a twentieth aspect, a computer program product including instructions is provided. When the instructions are run, the method in any one of the third aspect, the twelfth aspect or the possible implementations of the third aspect and the twelfth aspect is implemented.

According to a twenty-first aspect, a communication chip is provided. The communication chip stores instructions. When the instructions are run on a computer device, the communication chip is enabled to perform the method in any one of the first aspect to the fifteenth aspect and the possible implementations of the first aspect to the fifteenth aspect.

According to a twenty-second aspect, a communication system is provided. The communication system includes the communication apparatus in the seventeenth aspect and/or the communication apparatus in the eighteenth aspect.

DESCRIPTION OF EMBODIMENTS

Figure 1:
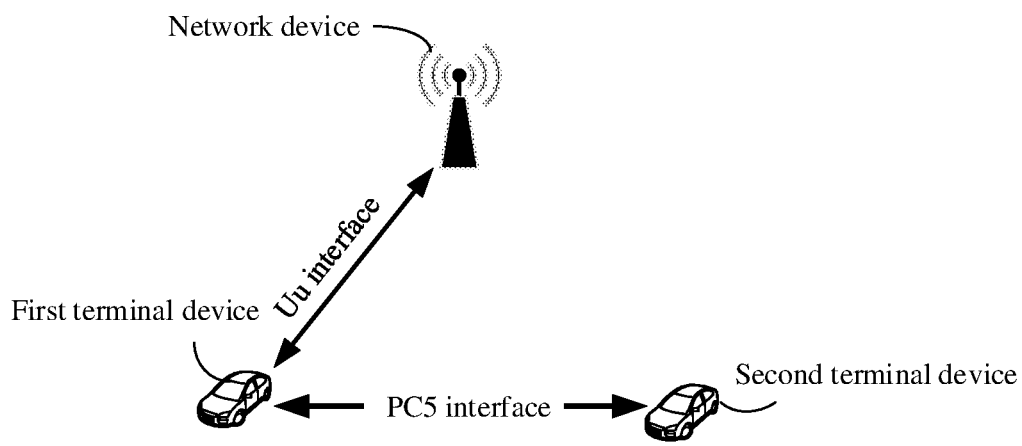
FIG. 1 is a schematic diagram of a communication system to which an embodiment of this application is applied.

The following describes technical solutions in embodiments of this application with reference to the accompanying drawings.

First, a communication system to which technical solutions provided in this application are applicable is described.

The technical solutions in embodiments of this application may be applied to various communication systems, for example, a long term evolution (LTE) system, an LTE frequency division duplex (FDD) system, an LTE time division duplex (TDD) system, a universal mobile communication system (UMTS), a worldwide interoperability for microwave access (WiMAX) communication system, a 5th generation (5G) system or a new radio (NR) system, a device to device (D2D) system, a vehicle to everything (V2X) system, or the like.

V2X is an important key technology that implements environment sensing, information exchange, and collaborative control by using a sensor, an electronic label, and the like mounted on a vehicle. For example, the technology may implement vehicle to network (V2N), vehicle to vehicle (V2V), vehicle to pedestrian (V2P), and vehicle to infrastructure (V2I) information exchange, and the like, to improve an intelligence level and a self-driving capability of the vehicle.

One participant of V2N is a terminal device, and the other participant is a service entity. V2N is currently the most widely used form of vehicle to everything, and a main function of V2N is to enable a vehicle to connect to a cloud server via a mobile network, to provide functions such as navigation, entertainment, and anti-theft through the cloud server.

Both participants of V2V are terminal devices. V2V may be used for information exchange and reminding between vehicles, and most typical application is an anti-collision safety system between the vehicles.

Both participants of V2P are terminal devices. V2P can be used to provide a safety warning to a pedestrian or a non-motor vehicle on a road.

In V2I, one participant is a terminal device, and the other participant is an infrastructure (or a road facility). V2I may be used for communication between a vehicle and an infrastructure. For example, the infrastructure may be a road, a traffic light, a barricade, or the like, and road management information such as a time sequence of a traffic light signal may be obtained.

A first communication device (first terminal device) and a second communication device (second terminal device) in embodiments of this application each may be user equipment (UE), a subscriber station (SS), a client device (customer Premise Equipment, CPE), an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in embodiments of this application. The terminal device may alternatively be a software and/or a hardware module deployed in an autonomous vehicle, an intelligent vehicle, a digital vehicle, or an internet-of-vehicles vehicle. The terminal device in embodiments of this application may be a D2D device or a V2X device.

A third communication device (network device) in embodiments of this application may be a device configured to communicate with the terminal device. The network device may be a base transceiver station (BTS) in the global system for mobile communications (GSM) or the code division multiple access (CDMA) system, or may be a NodeB (NB) in the wideband code division multiple access (WCDMA) system, or may be an evolved NodeB (eNB or eNodeB) in the LTE system, or may be a radio controller in a cloud radio access network (CRAN) scenario. Alternatively, the network device may be a relay station, an access point, a vehicle-mounted device, a wearable device, a network device (gNB) in the future 5G network, a network device in the future evolved PLMN, or the like. This is not limited in embodiments of this application. In a network structure, the network device may include a centralized unit (CU) node, or a distributed unit (DU) node, or a RAN device including a CU node and a DU node. The network device in embodiments of this application may be a road side unit (RSU).

In some deployments, a base station or a transmission point may further include a radio unit (RU). The CU implements some functions of the gNB or the transmission point, and the DU implements some functions of the gNB or the transmission point. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from the information at the PHY layer. Therefore, in the architecture, higher layer signaling such as RRC layer signaling or PHCP layer signaling may also be considered as being sent by the DU or sent by the DU and the RU. It may be understood that the network device may be a CU node, a DU node, or a device including the CU node and the DU node. In addition, the CU may be classified as a network device in an access network RAN, or the CU may be classified as a network device in a core network CN. This is not limited herein.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

FIG. 1 shows an example of a schematic diagram of a structure of a possible communication system. As shown in FIG. 1, the system architecture includes terminal devices (including a first terminal device and a second terminal device) and a network device. The terminal devices communicate with each other through a PC5 interface. A direct communication link between the terminal devices may be referred to as a sidelink (SL). The first terminal device communicates with the network device through a Uu interface.

Optionally, the system architecture in FIG. 1 may further include a V2X application server.

In a wireless communication network, a terminal device does not keep exchanging valid information with a network device or another terminal device, does not keep performing uploading or downloading services, and voice data resource is not transmitted continuously during a call. Therefore, discontinuous reception (DRX) may be configured, so that the terminal device periodically enters a sleep state at some time. The terminal device does not need to continuously monitor a physical downlink control channel (PDCCH), and wakes up from the sleep state when monitoring is required. This reduces power consumption of the terminal device. However, in a V2X scenario, in the conventional technology, a DRX configuration enabling mechanism, a status or a requirement of a terminal device at a receive end, and service-related information between terminal devices at a transmit and the receive end are seldom considered during DRX configuration. A sidelink discontinuous reception (SL DRX) configuration in embodiments of this application includes at least one of the following:

drx-onDurationTimerSL;
    drx-InactivityTimerSL;
    drx-RetransmissionTimerSL;
    drx-LongCycleSL;
    drx-LongCycleStartOffsetSL;
    drx-ShortCycleSL;
    drx-ShortCycleTimerSL;
    drx-HARQ-RTT-TimerSL;
    drx-SlotOffsetSL; and
    drx-StartOffsetSL.

The following describes a communication method in embodiments of this application with reference to FIG. 2 to FIG. 6.

Figure 2:
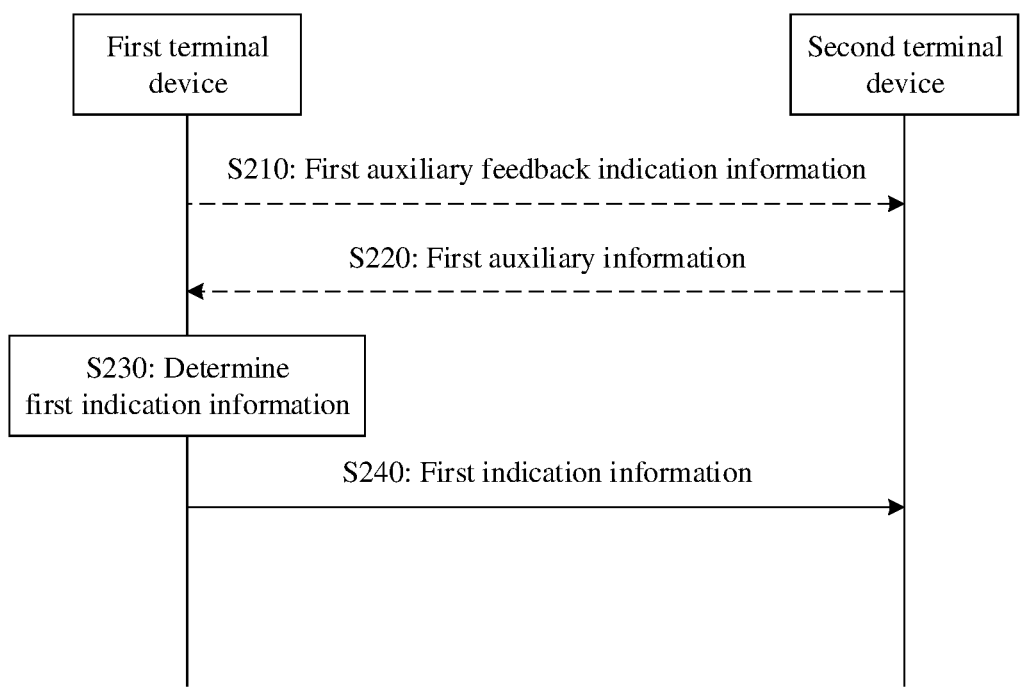
FIG. 2 is a schematic interaction diagram of a communication method 200 according to an embodiment of this application.

FIG. 2 is a schematic interaction diagram of a communication method 200 according to an embodiment of this application. It may be understood that a first terminal device and a second terminal device in FIG. 2 may be the terminal device in FIG. 1, or may be an apparatus (for example, a processor, a chip, or a chip system) in the terminal device. It may be further understood that a portion or all of information exchanged between the first terminal device and the second terminal device in FIG. 2 may be carried in an existing message, channel, signal, or existing signaling, or may be a newly defined message, channel, signal, or newly defined signaling. This is not specifically limited herein. As shown in FIG. 2, the method 200 includes the following steps.

S230: The first terminal device determines first indication information. The first indication information indicates an enabling operation determined for a first sidelink, the enabling operation includes enabling an SL DRX configuration for the first sidelink, or disabling an SL DRX configuration for the first sidelink, and the first sidelink is a sidelink between the first terminal device and the second terminal device. The first terminal device is a transmit end, and the second terminal device is a receive end.

"Determined" in "an enabling operation determined for a first sidelink" and "configured", "selected", "set", or the like may be used interchangeably. This is not limited in this embodiment of this application.

In this embodiment of this application, the first terminal device participates in determining the enabling operation for the first sidelink, and sends the determined enabling operation for the first sidelink to the second terminal device by using the first indication information. The first terminal device is the transmit end, the second terminal is the receive end, and the first terminal device is connected to a network device.

Optionally, that the first indication information indicates an enabling operation determined for a first sidelink includes: The first indication information includes first enabling indication information, where the first enabling indication information indicates to enable the SL DRX configuration for the first sidelink. Alternatively, the first indication information includes first disabling indication information, where the first disabling indication information indicates to disable the SL DRX configuration for the first sidelink.

Optionally, the communication method further includes: The first terminal device determines the first indication information based on fourth service-related information, where the fourth service-related information is service-related information between the first terminal device and the second terminal device. For example, the fourth service-related information may be a service cycle, a service volume in a specific time period, service duration, or information related to quality of service (QoS).

Optionally, the method 200 further includes: S220: The first terminal device receives first auxiliary information sent by the second terminal device, where the first auxiliary information includes one or more of power percentage information, a power level, sufficient power indication information, power saving type information of a terminal device, a recommended SL DRX configuration, SL DRX adjustment value information with null content, indication information for enabling or disabling an SL DRX configuration, and resource configuration information that are of the second terminal device. In this embodiment of this application, information included in the first auxiliary information may be in one piece of first auxiliary information, or may be in a plurality of pieces of first auxiliary information. In other words, the information may be included in one piece of first auxiliary information and sent together, or may be sent in a plurality of pieces of first auxiliary information separately or in combination.

In a possible implementation, the first terminal device determines the first indication information based on the first auxiliary information.

For example, if the power percentage information in the first auxiliary information is greater than a preset threshold, the first terminal device determines to disable the SL DRX configuration. Otherwise, if the power percentage information in the first auxiliary information is less than the preset threshold, the first terminal device determines to enable the SL DRX configuration.

Optionally, if the sufficient power indication information in the first auxiliary information indicates that power is sufficient, the first terminal device determines to disable the SL DRX configuration. Otherwise, if the sufficient power indication information in the first auxiliary information indicates that power is insufficient or power is very low, the first terminal device determines to enable the SL DRX configuration. It may be understood that a condition for determining sufficient power may be comparing with a preset power.

Optionally, if the power level in the first auxiliary information is greater than a preset level, the first terminal device determines to disable the SL DRX configuration. If the power level in the first auxiliary information is less than the preset level, the first terminal device determines to enable the SL DRX configuration. In other words, the first terminal device determines a power status based on the power level, and further determines whether to enable the SL DRX configuration.

Optionally, the first terminal device determines, based on the recommended SL DRX configuration in the first auxiliary information, to enable or disable the SL DRX configuration. For example, the first terminal device may perform determining based on a cycle in the recommended SL DRX configuration, and disable the SL DRX configuration if the cycle is excessively short; or determine a requirement of the second terminal device based on the recommended SL DRX configuration, and determine the enabling operation of the SL DRX configuration based on the requirement.

Optionally, if the power saving type information of the terminal device in the first auxiliary information is a non-power saving type, the first terminal device determines to disable the SL DRX configuration. Otherwise, if the power saving type information of the terminal device in the first auxiliary information is a power saving type, the first terminal device determines to enable the SL DRX configuration.

Optionally, the first terminal device determines, based on the SL DRX adjustment value information with null content in the first auxiliary information, to disable the SL DRX configuration. Otherwise, the first terminal device determines to enable the SL DRX configuration. It may be understood that the first terminal device may alternatively determine, based on the SL DRX adjustment value information with null content in the first auxiliary information, to enable the SL DRX configuration. In other words, the SL DRX adjustment value information with null content may be an enabling trigger condition or a disabling trigger condition, and the rule is determined or predefined by the first terminal device.

Optionally, the first terminal device determines, based on the indication information for disabling the SL DRX configuration in the first auxiliary information, to disable the SL DRX configuration. Otherwise, the first terminal device determines to enable the SL DRX configuration.

In a possible implementation, the first terminal device determines the first indication information based on a service feature of the first sidelink.

For example, when determining that a service cycle is less than a preset threshold or a service volume in a unit time is greater than a preset threshold, the first terminal device determines to disable the SL DRX configuration. Otherwise, the first terminal device determines to enable the SL DRX configuration. The preset threshold may be determined by the first terminal device, or the preset threshold is preconfigured, or the preset threshold is specified in a protocol. Alternatively, the first terminal device may determine, based on QoS information, to disable the SL DRX configuration information. For example, when a priority in service QoS information is higher than a predetermined threshold, or a delay requirement is less than a predetermined threshold (that is, a minimum delay required by a service is less than the preset threshold), the first terminal device determines to disable the SL DRX configuration. Otherwise, the first terminal device determines to enable the SL DRX configuration.

Optionally, the method 200 further includes: S210: The first terminal device sends first auxiliary feedback indication information to the second terminal device, where the first auxiliary feedback indication information indicates the second terminal device to send auxiliary information related to the SL DRX configuration to the first terminal device. The auxiliary information related to the SL DRX configuration includes one or more of power percentage information, a power level, sufficient power indication information, power saving type information of a terminal device, a recommended SL DRX configuration, SL DRX adjustment value information with null content, indication information for enabling or disabling an SL DRX configuration, and resource configuration information that are of the second terminal device.

Optionally, the first auxiliary feedback indication information indicates the second terminal device to send the first auxiliary information to the first terminal device.

Optionally, the first auxiliary feedback indication information may include an identifier of the second terminal device.

Optionally, the first auxiliary feedback indication is carried in SCI, a MAC CE, or a PC5-RRC message, for example, may be carried in a PC5-RRC reconfiguration message.

Optionally, in a possible implementation, the network device sends first auxiliary feedback indication information to the second terminal device, where the first auxiliary feedback indication information indicates the second terminal device to send auxiliary information related to the SL DRX configuration to the first terminal device. Alternatively, the network device preconfigures auxiliary information related to the SL DRX configuration sent by the second terminal device to the first terminal device. In other words, the second terminal device may autonomously determine, based on a configuration of the network device, to send the first auxiliary information.

In this embodiment of this application, there are a plurality of feasible implementations in which the second terminal device determines to send the first auxiliary information to the first terminal device.

In an implementation in which the second terminal device determines to send the first auxiliary information, the second terminal device determines, based on the first auxiliary feedback indication information sent by the first terminal device, to send the first auxiliary information to the first terminal device.

In another implementation in which the second terminal device determines to send the first auxiliary information, the second terminal device determines, based on the first auxiliary feedback indication information sent by the network device, to send the first auxiliary information to the first terminal device.

In still another implementation in which the second terminal device determines to send the first auxiliary information, the second terminal device determines, based on the configuration of the network device, to send the first auxiliary information to the first terminal device. In other words, the network device configures the second terminal device to send the first auxiliary information to the first terminal device.

In yet another implementation in which the second terminal device determines to send the first auxiliary information, when the second terminal device sends the first auxiliary information to the first terminal device, the second terminal device starts a timer (timer 1, T1).

Optionally, the second terminal device determines to send the first auxiliary information when one or more of the following conditions are met:

Condition 1: When one or more items in current SL DRX-related auxiliary information of the second terminal device are different from a corresponding item in SL DRX-related auxiliary information fed back previously. In other words, when one or more items in the current SL DRX-related auxiliary information change and a change amount exceeds a preset threshold, the second terminal device determines to send the first auxiliary information to the first terminal device. It may be understood that the first auxiliary information may carry the changed item or the change amount of the changed item. For example, when a current power percentage of the second terminal device decreases by 50% compared with a power percentage fed back previously, the second terminal device may send, to the first terminal device, information indicating that the current power percentage decreases.

Condition 2: When the second terminal device has sufficient power and the current SL DRX configuration takes effect, the second terminal device determines to send the first auxiliary information to the first terminal device.

Condition 3: When the second terminal device has insufficient power or excessively low power, and the current SL DRX configuration does not take effect, the second terminal device determines to send the first auxiliary information to the first terminal device.

Condition 4: When the second terminal device has a power saving requirement, the second terminal device determines to send the first auxiliary information to the first terminal device.

Condition 5: The timer T1 is not running.

S240: The first terminal device sends the first indication information to the second terminal device, where the first indication information indicates the enabling operation determined for the first sidelink. Correspondingly, the second terminal device receives the first indication information, and performs the enabling operation of the SL DRX configuration on the first sidelink based on the first indication information.

Optionally, the first indication information includes first enabling indication information, and the first enabling indication information indicates to enable the SL DRX configuration for the first sidelink. The first enabling indication information may be a newly defined message, or may be an existing message, for example, a sidelink control information (SCI) message, a media access control control element (MAC CE) message, or a PC5-radio resource control (RRC) message.

Optionally, the first enabling indication information may be SL DRX configuration information, or the first enabling indication information is carried in the SL DRX configuration information.

Optionally, the first indication information includes first disabling indication information, and the first disabling indication information indicates to disable the SL DRX configuration for the first sidelink. The first disabling indication information may be a newly defined message, or may be an existing message such as SCI, a MAC CE, or a PC5-RRC message.

Optionally, the first disabling indication information further includes first SL DRX configuration release indication information, and the second terminal device releases the SL DRX configuration for the first sidelink based on the first SL DRX configuration release indication information. In this embodiment of this application, after determining the enabling operation of the SL DRX configuration for the first sidelink based on the service-related information and/or the auxiliary information fed back by the second terminal device, the first terminal device sends the first indication information to the second terminal device, to ensure consistency of enabling of the SL DRX configuration between the first terminal device and the second terminal device. The first terminal device performs SL DRX enabling configuration based on a status and/or the requirement of the second terminal device.

Figure 3:
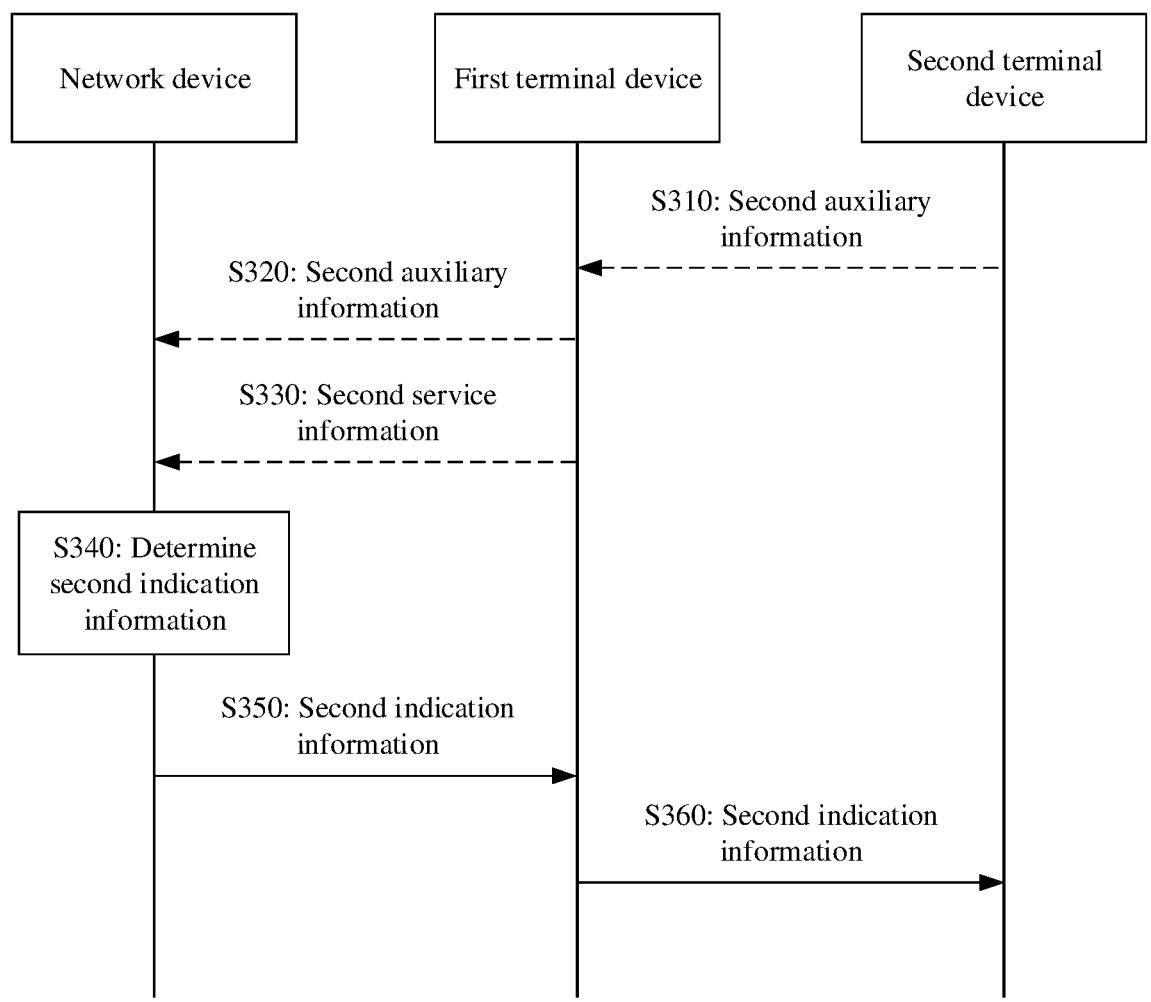
FIG. 3 is a schematic interaction diagram of a communication method 300 according to an embodiment of this application.

FIG. 3 is a schematic interaction diagram of a communication method 300 according to an embodiment of this application. It may be understood that a portion or all of information exchanged between devices in FIG. 3 may be carried in an existing message, channel, signal, or existing signaling, or may be a newly defined message, channel, signal, or newly defined signaling. This is not specifically limited herein. The method 300 includes the following steps.

S340: A network device determines second indication information. The second indication information indicates an enabling operation of an SL DRX configuration determined for a first sidelink. The first sidelink is a sidelink between a first terminal device and a second terminal device. The first terminal device is a transmit end, and the second terminal device is a receive end.

Optionally, the method 300 further includes: S330: The network device receives first service-related information sent by the first terminal device, where the first service-related information is service-related information between the first terminal device and the second terminal device. The network device determines the second indication information based on the first service-related information. For example, the first service-related information may include a service cycle, a service volume in a specific time period, service duration, or the like. In other words, the first terminal device feeds back the service-related information to the network device, to provide a reference for the network device. Optionally, the first service-related information is carried in a DCI message, a MAC CE message, or an RRC message.

Optionally, the communication method 300 further includes: The network device sends first service-related feedback indication information to the first terminal device, where the first service-related feedback indication information indicates to send the first service-related information to the network device. Optionally, the first service-related feedback indication information is carried in a DCI message, a MAC CE message, or an RRC message.

In a possible implementation, the network device determines the second indication information based on the first service-related information.

Optionally, for example, when determining that a service cycle is less than a preset threshold or a service volume in a unit time is greater than a preset threshold, the network device determines to disable the SL DRX configuration. Otherwise, the first terminal device determines to enable the SL DRX configuration. The preset threshold may be determined by the network device, or the preset threshold is preconfigured, or the preset threshold is specified in a protocol.

Optionally, the method 300 further includes: S320: The network device receives second auxiliary information sent by the first terminal device, where the second auxiliary information includes one or more of power percentage information, a power level, sufficient power indication information, power saving type information of a terminal device, SL DRX adjustment value information with null content, indication information for enabling or disabling an SL DRX configuration, and resource configuration information that are of the second terminal device.

In a possible implementation, the network device determines the second indication information based on the second auxiliary information.

For example, if the power percentage information in the second auxiliary information is greater than a preset threshold, the network device determines to disable the SL DRX configuration. Otherwise, if the power percentage information in the second auxiliary information is less than the preset threshold, the network device determines to enable the SL DRX configuration.

Optionally, if the sufficient power indication information in the second auxiliary information indicates that power is sufficient, the network device determines to disable the SL DRX configuration. Otherwise, if the sufficient power indication information in the second auxiliary information indicates that power is insufficient, the network device determines to enable the SL DRX configuration. It may be understood that a condition of determining sufficient power, insufficient power, or excessively low power may be comparing with a preset power.

Optionally, if the power level in the second auxiliary information is greater than a preset level, the network device determines to disable the SL DRX configuration. If the power level in the second auxiliary information is less than the preset level, the network device determines to enable the SL DRX configuration. In other words, the network device determines a power status based on the power level, and further determines whether to enable the SL DRX configuration.

Optionally, if the power saving type information of the terminal device in the second auxiliary information is a non-power saving type, the network device determines to disable the SL DRX configuration. Otherwise, if the power saving type information of the terminal device in the second auxiliary information is a power saving type, the network device determines to enable the SL DRX configuration.

Optionally, the network device determines, based on the SL DRX adjustment value information with null content in the second auxiliary information, to disable the SL DRX configuration. Otherwise, the network device determines to enable the SL DRX configuration. It may be understood that the network device may alternatively determine, based on the SL DRX adjustment value information with null content in the second auxiliary information, to enable the SL DRX configuration. In other words, the SL DRX adjustment value information with null content may be an enabling trigger condition or a disabling trigger condition, and the rule is determined or predefined by the network device.

Optionally, the network device determines, based on the indication information for disabling the SL DRX configuration in the second auxiliary information, to disable the SL DRX configuration. Otherwise, the network device determines to enable the SL DRX configuration.

Optionally, the method further includes: The first terminal device sends second auxiliary feedback indication information to the second terminal device, where the second auxiliary feedback indication information indicates the second terminal device to send the second auxiliary information.

Optionally, the method further includes: The network device sends second auxiliary feedback indication information to the second terminal device, where the second auxiliary feedback indication information indicates the second terminal device to send the second auxiliary information. Alternatively, the network device configures the second terminal device to send the second auxiliary feedback indication information. The configuration may be performed by using a message or signaling that is newly defined or predefined, or by using an existing message such as SCI, a MAC CE, or a PC5-RRC message.

In this embodiment of this application, the first service feedback indication information and the second auxiliary feedback indication information may be carried in a same piece of information, or may be separately sent. This is not limited in this embodiment of this application.

Optionally, the method 300 further includes: S310: The first terminal device receives second auxiliary information sent by the second terminal device, where the second auxiliary information includes one or more of power percentage information, a power level, sufficient power indication information, power saving type information of a terminal device, SL DRX adjustment value information with null content, indication information for enabling or disabling an SL DRX configuration, and resource configuration information that are of the second terminal device.

S350: The network device sends the second indication information to the first terminal device, where the second indication information indicates the enabling operation of the SL DRX configuration determined for the first sidelink. Correspondingly, the first terminal device receives the second indication information from the network device. In other words, the network device may send, to the first terminal device, the enabling operation of the SL DRX configuration determined for the first sidelink.

S360: The first terminal device sends the second indication information to the second terminal device, and correspondingly, the second terminal device receives the second indication information from the first terminal. In other words, the first terminal device may send, to the second terminal device, the enabling operation of the SL DRX configuration determined for the first sidelink. It may be understood that the first terminal device may directly forward the second indication information received in S350 to the second terminal device, or may preprocess the second indication information received in S350 and then send the preprocessed second indication information to the second terminal device. For example, the preprocessing may include filtering, combination, splitting, and the like.

Optionally, the second indication information may include second enabling indication information, and the second enabling indication information indicates to enable the SL DRX configuration for the first sidelink. The second enabling indication information may be a newly defined message, or may be an existing message such as SCI, a MAC CE, or a PC5-RRC message.

Optionally, the second enabling indication information may be SL DRX configuration information, or the second enabling indication information is carried in the SL DRX configuration information.

Optionally, the second indication information may include second disabling indication information, and the second disabling indication information indicates to disable the SL DRX configuration for the first sidelink. The second disabling indication information may be a newly defined message, or may be an existing message such as SCI, a MAC CE, or a PC5-RRC message.

Optionally, the second disabling indication information further includes second SL DRX configuration release indication information, and the second terminal device releases the SL DRX configuration for the first sidelink based on the second SL DRX configuration release indication information.

In this embodiment of this application, after determining the enabling operation of the SL DRX configuration for the first sidelink based on the service-related information and/or the auxiliary information fed back by the second terminal device, the network device sends the first indication information to the second terminal device. After receiving the second indication information from the network device, the first terminal sends the second indication information to the second network device, to ensure consistency of enabling of the SL DRX configuration between the first terminal device and the second terminal device. The first terminal device performs SL DRX enabling configuration based on a status and/or the requirement of the second terminal device.

Figure 4:
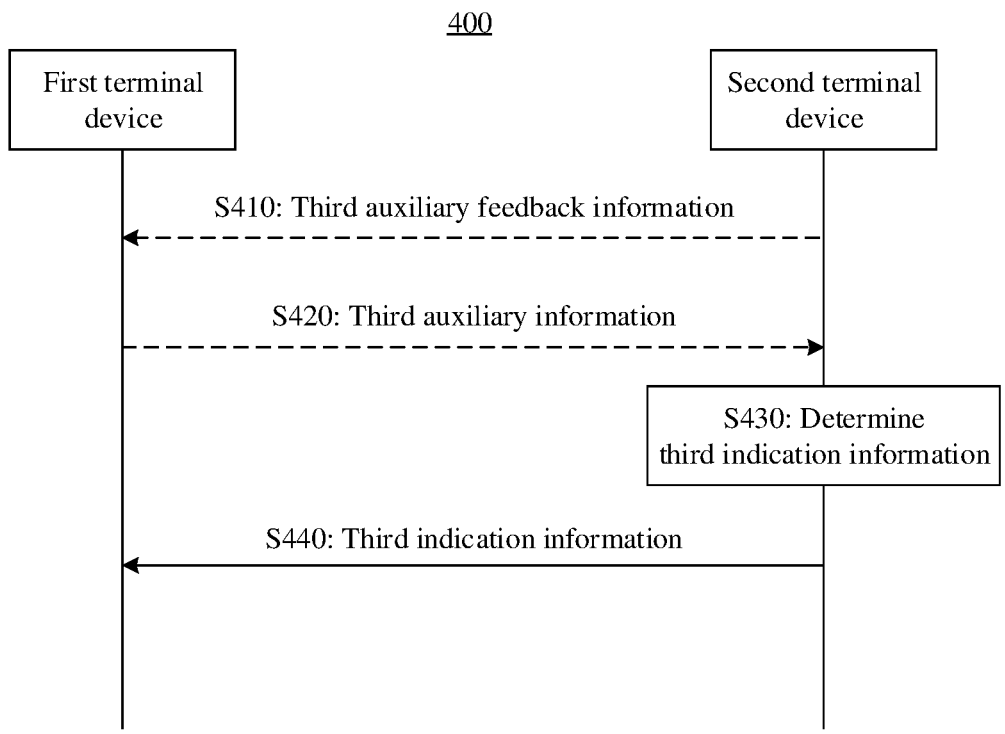
FIG. 4 is a schematic interaction diagram of a communication method 400 according to an embodiment of this application.

FIG. 4 is a schematic interaction diagram of a communication method 400 according to an embodiment of this application. It may be understood that a portion or all of information exchanged between devices in FIG. 4 may be carried in an existing message, channel, signal, or existing signaling, or may be a newly defined message, channel, signal, or newly defined signaling. This is not specifically limited herein. The method 400 includes the following steps.

S430: A second terminal device determines third indication information. The third indication information indicates an enabling operation determined for the first sidelink, and the first sidelink is a sidelink between a first terminal device and the second terminal device. The first terminal device is a transmit end, and the second terminal device is a receive end.

In this embodiment of this application, determining the third indication information by second terminal device may be understood as that the second terminal device determines to enable or disable an SL DRX configuration.

In a possible implementation, the second terminal device determines the third indication information based on the third auxiliary information.

Optionally, the method 400 further includes: S420: The second terminal device receives third auxiliary information sent by the first terminal device, where the third auxiliary information includes one or more of the following information: service-related information and resource configuration information that are between the first terminal device and the second terminal device.

Optionally, the second terminal device determines the third indication information based on the service-related information in the third auxiliary information. For example, when determining that a service cycle is less than a preset threshold or a service volume in a unit time is greater than a preset threshold, the second terminal device determines to disable the SL DRX configuration. Otherwise, the second terminal device determines to enable the SL DRX configuration. The preset threshold may be determined by the second terminal device, or the preset threshold is preconfigured, or the preset threshold is specified in a protocol.

Optionally, the second terminal device determines the third indication information based on the resource configuration information in the third auxiliary information. For example, when resources in the resource configuration information are intensive, the second terminal device determines to disable the SL DRX configuration. In other words, when the configured resources are intensive, the second terminal device frequently sends and receives services, and determines to disable the SL DRX configuration.

Optionally, the method further includes: S410: The first terminal device receives third auxiliary feedback indication information, where the third auxiliary feedback indication information indicates to send the third auxiliary information to the second terminal device.

Optionally, the first terminal device receives the third auxiliary feedback indication information from the second terminal device. It may be understood that, when determining the third indication information, the second terminal device may indicate the first terminal device to send the third auxiliary information to the second terminal device, where the third auxiliary information includes the service-related information and the resource configuration information that are between the first terminal device and the second terminal device. For example, the service-related information between the first terminal device and the second terminal device may be a service cycle, a service volume in a specific time period, or service duration, and the resource configuration information may include a resource configuration density and the like.

Optionally, a network device configures the first terminal to send the third auxiliary information to the second terminal device. It may be understood that the network device indicates, by using configuration information, the first terminal device to send the third auxiliary information to the second terminal device. The configuration information may be predefined, or may be new signaling or a new message.

Optionally, the method further includes: The second terminal device autonomously determines to send the third auxiliary information. For example, the second terminal device determines the third indication information based on a sending service requirement. When the second terminal device uses a contention resource (mode 2), if the second terminal device does not need to send a service, the second terminal device determines to enable the SL DRX configuration, to be specific, determines that the third indication information is third enabling indication information. When the second terminal device determines that a service needs to be sent, the second terminal device determines to disable the SL DRX configuration, obtains a resource through random selection in a previous second, and starts sensing simultaneously.

In another possible manner, when the second terminal device determines that a service needs to be sent, the second terminal device determines to disable the SL DRX configuration, and/or the second terminal device obtains a resource through random selection in first t time units after determining that the service needs to be sent, where t is an integer or a decimal greater than 0. Optionally, when the resource is obtained through random selection in the foregoing t time units, sensing is started; and/or after the t time units end, no resource is obtained through random selection, but a resource is obtained or determined based on a sensing result. The sensing may be full sensing or partial sensing. It may be understood that the t time units are merely examples, and the resource may alternatively be obtained through random selection in N symbol slots, where N is an integer greater than 0.

Optionally, the t time units may be preconfigured or predefined, or may be determined by the second terminal device, or may be configured by the network device. This is not limited in this embodiment of this application. The time unit may be one of a second, a millisecond, a slot, and a symbol. For example, the t time units may be 100 milliseconds, 1100 milliseconds, or 1000 milliseconds. This is not limited in this application.

In still another possible manner, when the second terminal device determines that a service needs to be sent, the second terminal device determines to disable the SL DRX configuration, and/or starts sensing. Before a sensing result is obtained, a resource is obtained through random selection, and/or after the sensing result is obtained, the resource is obtained or determined based on the sensing result. It may be understood that, in this embodiment of this application, an occasion of switching between the random selection manner and the sensing manner may alternatively be the first symbol after the sensing result is obtained, or may be the $n^{th}$ symbol, where n is an integer greater than 0. In other words, the resource may be obtained or determined based on the sensing result immediately after the sensing result is obtained, or the resource may be obtained or determined based on the sensing result in a period of time after the sensing result is obtained. It may be understood that obtaining or determining the resource in this embodiment of this application may also be understood as selecting the resource or reselecting the resource.

It may be understood that, in this embodiment of this application, that the communication device needs to send a service includes but is not limited to: The communication device is configured to perform SL communication, the communication device is configured to transmit SL communication, or the communication device is interested in SL communication, or the communication device is interested in transmitting SL communication, or another communication device determines that a service needs to be sent. This is not limited in this application.

For a specific implementation of triggering the second terminal device to send the third auxiliary information, refer to the descriptions in the method 200. Details are not described in this embodiment of this application.

In a possible implementation, the second terminal device determines the third indication information based on energy saving requirement information.

Optionally, when the second terminal device determines that a power level of the second terminal device is greater than a preset threshold, or the second terminal device has sufficient power, or the second terminal device is a terminal of a non-power saving type, or the second terminal device determines that there is no energy saving requirement, the second terminal device determines to disable the SL DRX configuration. In other words, in this case, the second terminal device determines that the third indication information is indication information of a disabling SL DRX configuration type. Otherwise, the second terminal device determines to enable the SL DRX configuration, in other words, determines that the third indication information is indication information of an enabling SL DRX configuration type.

S440: The second terminal device sends the third indication information to the first terminal device, and correspondingly, the first terminal device receives the third indication information. It may be understood that the third indication information may be immediately sent to the first terminal device after being determined in S430, or may be sent to the first terminal device after a specific period.

Optionally, the third indication information may include third enabling indication information, and the third enabling indication information indicates to enable the SL DRX configuration for the first sidelink. The third enabling indication information may be a newly defined message, or may be an existing message.

Optionally, the third enabling indication information may be SL DRX configuration information, or the third enabling indication information is carried in the SL DRX configuration information.

Optionally, the third indication information may include third disabling indication information, and the third disabling indication information indicates to disable the SL DRX configuration for the first sidelink. The third enabling indication information may be a newly defined message, or may be an existing message.

Optionally, the third disabling indication information further includes third SL DRX configuration release indication information, and the first terminal device releases the SL DRX configuration for the first sidelink based on the third SL DRX configuration release indication information.

In this embodiment of this application, the second terminal device may determine the third indication information with reference to a plurality of pieces of information (the first auxiliary information, the resource configuration information, sending service requirement information, and the like). In other words, there are a plurality of trigger conditions for determining the third indication information by the second terminal device. Whether these trigger conditions are all met is not limited in this embodiment of this application. The second terminal device may determine to send the third indication information to the first terminal device when a single trigger condition is met, or may determine to send the third indication information to the first terminal device when a combination of trigger conditions (for example, a trigger condition 1 and a trigger condition 2) are met.

It may be understood that the plurality of trigger conditions include trigger conditions described above: whether the second terminal device sends a service, in other words, whether there is a service sending requirement, whether a volume of a to-be-sent service exceeds a preset threshold, whether service duration exceeds a threshold, power information of the second terminal device, the energy saving requirement information, and the like, and also include trigger conditions such as timer duration.

For example, in a possible implementation, to avoid excessively high frequency of sending the third indication information by the second terminal device, after the second terminal device determines whether to enable the SL DRX configuration for the first sidelink, there are a plurality of feasible methods to prevent the second terminal device from frequently sending information indicating to enable or disable the SL DRX configuration to the first terminal device. In other words, after determining the third indication information, the second terminal device may determine whether to send the third indication information to the first terminal device.

For example, when the second terminal device uses an autonomous resource allocation manner (for example, a mode 2), when the trigger condition that the second terminal device sends the service, in other words, there is the service sending requirement, is met, the second terminal device determines to send the third indication information to the first terminal device. Alternatively, the second terminal device determines to send the third indication information to the first terminal device only when the three trigger conditions are all met: whether the second terminal device sends the service, in other words, whether there is the service sending requirement, whether the volume of the to-be-sent service exceeds the preset threshold, whether the service duration exceeds the preset threshold. Alternatively, the second terminal device determines to send the third indication information to the first terminal device only when all of the three trigger conditions are met: whether the second terminal device sends the service, in other words, whether there is the service sending requirement, whether the volume of the to-be-sent service exceeds the preset threshold, and a timer (timer 2, T2) is not running. The timer T2 may be started when the second terminal device sends, to the first terminal device, an indication for enabling the SL DRX configuration.

For example, when the second terminal determines, based on whether to send the service, that a condition for triggering enabling or disabling SL DRX is met, the second terminal waits for a period of time and then indicates the first terminal device to enable or disable an SL DRX configuration between the first terminal device and the second terminal device. For example, when the second terminal device indicates the first terminal device to enable the SL DRX configuration, the timer T2 is started. Subsequently, when the second terminal device determines, based on whether to send the service, that a condition for triggering enabling the SL DRX configuration is met, if T2 is not running, the second terminal device indicates the first terminal device to enable the SL DRX configuration.

For example, when the second terminal device determines, based on whether to send the service, that a condition for triggering disabling SL DRX is met, the second terminal device first disables only an SL DRX configuration on the second terminal side. If the volume of the to-be-sent service exceeds the preset threshold or the service duration exceeds the preset threshold, the second terminal device indicates the first terminal device to disable an SL DRX configuration between the first terminal device and the second terminal device.

Optionally, in this embodiment of this application, when the second terminal device determines that a disabling condition is met, to be specific, determines that the third indication information is the third disabling indication information, the second terminal device may immediately trigger disabling of the SL DRX configuration on the second terminal device side, and then send the third disabling indication information to the first terminal device after a specific time period or a cycle. In the foregoing implementation, when a disabling trigger condition is met, the terminal device at the receive end may immediately trigger disabling of the SL DRX configuration of the receive end, and after a period of time, indicate the terminal device at the transmit end to disable the SL DRX configuration.

In another configuration enabling method 400A provided in an embodiment of this application, when a second terminal device determines that a service needs to be sent, the second terminal device determines to disable an SL DRX configuration. According to the method, the second terminal device may flexibly determine an enabling operation of the SL DRX configuration based on a service requirement. The method includes:

The second terminal device determines third indication information based on service requirement information, where the third indication information indicates an enabling operation for a first sidelink, the enabling operation includes enabling the sidelink discontinuous reception SL DRX configuration for the first sidelink, or disabling the SL DRX configuration for the first sidelink, and the first sidelink is a sidelink between a first terminal device and the second terminal device.

In a possible manner, when the second terminal device determines that the service needs to be sent, the third indication information indicates to disable the SL DRX configuration for the first sidelink.

Optionally, when the second terminal device determines that the service needs to be sent, this embodiment of this application provides several possible manners of obtaining a resource by the second terminal device.

Resource obtaining manner 1: The second terminal device obtains or determines a resource through random selection in first t time units after determining that the service needs to be sent, where t is an integer or a decimal greater than 0.

Resource obtaining manner 2: The second terminal device obtains or determines a resource through random selection in first t time units after determining that the service needs to be sent, and starts sensing.

Resource obtaining manner 3: The second terminal device obtains or determines a resource through random selection and starts sensing in first t time units after determining that the service needs to be sent, and determines to obtain or reselect the resource based on a sensing result after the t time units end.

Resource obtaining manner 4: The second terminal device obtains or determines a resource through random selection in first t time units after determining that the service needs to be sent, and determines to obtain or reselect the resource based on a sensing result after the t time units end. It may be understood that the second terminal device may start sensing immediately after the t time units end, or may start sensing in M time units after the t time units end, where M is an integer greater than 0. This is not limited in this application.

Optionally, before obtaining the sensing result, the second terminal device obtains the resource in a random selection manner, and/or after the second terminal device obtains the sensing result, the second terminal device obtains or determines the resource based on the sensing result.

In other words, in a possible manner, when the second terminal device determines that a service needs to be sent, the second terminal device determines to disable the SL DRX configuration, and/or the second terminal device obtains a resource through random selection in first t time units after determining that the service needs to be sent, where t is an integer or a decimal greater than 0. Optionally, when the resource is obtained through random selection in the foregoing t time units, sensing is started; and/or after the t time units end, no resource is obtained through random selection, but a resource is obtained or determined based on a sensing result. The sensing may be full sensing or partial sensing.

In still another possible manner, when the second terminal device determines that a service needs to be sent, the second terminal device determines to disable the SL DRX configuration, and/or starts sensing. Before a sensing result is obtained, a resource is obtained through random selection, and/or after the sensing result is obtained, the resource is obtained or determined based on the sensing result. It may be understood that, in this embodiment of this application, an occasion of switching between the random selection manner and the sensing manner may alternatively be the first symbol after the sensing result is obtained, or may be the $n^{th}$ symbol, where n is an integer greater than 0. In other words, the resource may be obtained or determined based on the sensing result immediately after the sensing result is obtained, or the resource may be obtained or determined based on the sensing result in a period of time after the sensing result is obtained. It may be understood that obtaining or determining the resource in this embodiment of this application may also be understood as selecting the resource or reselecting the resource.

The t time units in this application may be preconfigured or predefined, or may be determined by the second terminal device, or may be configured by the network device. This is not limited in this embodiment of this application. For example, the time unit may be one of a second, a millisecond, a slot, and a symbol. For example, the t time units may be 100 milliseconds, 1100 milliseconds, or 1000 milliseconds. This is not limited in this application.

In another possible implementation, the second terminal device sends the third indication information to the first terminal device, so that the first terminal device determines the enabling operation of SL DRX for the first sidelink based on the third indication information, and is aligned with the second terminal device, to ensure sidelink communication quality. It may be understood that the second communication device indicates the first communication device to enable the SL DRX, to help reduce power consumption of the sidelink. In addition, the second communication device indicates the first communication device to disable the SL DRX, to increase resource scheduling efficiency (or resource utilization) of the first communication device, and ensure quality of the service sent by the first communication device to the second communication device.

In another configuration enabling method 400B provided in an embodiment of this application, when a second terminal device determines that a service needs to be sent, the second terminal device determines to disable an SL DRX configuration. According to the method, the second terminal device may flexibly determine an enabling operation of the SL DRX configuration based on a service requirement. The method includes:

When determining that the service needs to be sent, the second terminal device determines to disable an SL DRX configuration for a first sidelink, where the first sidelink is a sidelink between a first terminal device and the second terminal device.

Optionally, before the second terminal device determines that the service needs to be sent, the method may further include: The second terminal device determines service requirement information, where the service requirement includes that the second terminal device needs to send the service or that the second terminal device does not need to send the service.

Optionally, the second terminal device determines third indication information, where the third indication information indicates the enabling operation for the first sidelink, the enabling operation includes enabling the sidelink discontinuous reception SL DRX configuration for the first sidelink, or disabling the SL DRX configuration for the first sidelink, and the first sidelink is the sidelink between the first terminal device and the second terminal device. Determining the third indication information by the second terminal device may be understood as that the second terminal device determines the third indication information based on the service requirement information. Alternatively, it may be understood that the second terminal device determines the third indication information after receiving an indication of another network element.

In a possible manner, when the second terminal device determines that the service needs to be sent, the second communication device indicates a lower layer to disable the SL DRX configuration for the first sidelink. That the second terminal device determines that the service needs to be sent includes: An upper layer of the second terminal device determines that the service needs to be sent. In other words, the upper layer of the second terminal device may send the third indication information to the lower layer, to indicate the enabling operation of SL DRX for the first sidelink. The enabling operation includes enabling SL DRX or disabling SL DRX. The upper layer of the second terminal device is a protocol layer above the lower layer of the second terminal device. For example, the upper layer may be an application layer, and the lower layer may be a vehicle to everything (V2X) layer or an access stratum (AS). In another possible manner, the upper layer may be a V2X layer, and the lower layer may be an access stratum.

Optionally, when the second terminal device determines that the service needs to be sent, this embodiment of this application provides several possible manners of obtaining a resource by the second terminal device.

Resource obtaining manner 1: The second terminal device obtains or determines a resource through random selection in first t time units after determining that the service needs to be sent, where t is an integer or a decimal greater than 0.

Resource obtaining manner 2: The second terminal device obtains or determines a resource through random selection in first t time units after determining that the service needs to be sent, and starts sensing.

Resource obtaining manner 3: The second terminal device obtains or determines a resource through random selection and starts sensing in first t time units after determining that the service needs to be sent, and determines to obtain or reselect the resource based on a sensing result after the t time units end.

Resource obtaining manner 4: The second terminal device obtains or determines a resource through random selection in first t time units after determining that the service needs to be sent, and determines to obtain or reselect the resource based on a sensing result after the t time units end. It may be understood that the second terminal device may start sensing immediately after the t time units end, or may start sensing in M time units after the t time units end, where M is an integer greater than 0. This is not limited in this application.

Optionally, before obtaining the sensing result, the second terminal device obtains the resource in a random selection manner, and/or after the second terminal device obtains the sensing result, the second terminal device obtains or determines the resource based on the sensing result.

In other words, in a possible manner, when the second terminal device determines that a service needs to be sent, the second terminal device determines to disable the SL DRX configuration, and/or the second terminal device obtains a resource through random selection in first t time units after determining that the service needs to be sent, where t is an integer or a decimal greater than 0. Optionally, when the resource is obtained through random selection in the foregoing t time units, sensing is started; and/or after the t time units end, no resource is obtained through random selection, but a resource is obtained or determined based on a sensing result. The sensing may be full sensing or partial sensing.

In still another possible manner, when the second terminal device determines that a service needs to be sent, the second terminal device determines to disable the SL DRX configuration, and/or starts sensing. Before a sensing result is obtained, a resource is obtained through random selection, and/or after the sensing result is obtained, the resource is obtained or determined based on the sensing result. It may be understood that, in this embodiment of this application, an occasion of switching between the random selection manner and the sensing manner may alternatively be the first symbol after the sensing result is obtained, or may be the $n^{th}$ symbol, where n is an integer greater than 0. In other words, the resource may be obtained or determined based on the sensing result immediately after the sensing result is obtained, or the resource may be obtained or determined based on the sensing result in a period of time after the sensing result is obtained. It may be understood that obtaining or determining the resource in this embodiment of this application may also be understood as selecting the resource or reselecting the resource.

The t time units in this application may be preconfigured or predefined, or may be determined by the second terminal device, or may be configured by the network device. This is not limited in this embodiment of this application. For example, the time unit may be one of a second, a millisecond, a slot, and a symbol. For example, the t time units may be 100 milliseconds, 1100 milliseconds, or 1000 milliseconds. This is not limited in this application.

In another possible implementation, the second terminal device sends the third indication information to the first terminal device, so that the first terminal device determines the enabling operation of SL DRX for the first sidelink based on the third indication information, and is aligned with the second terminal device, to ensure sidelink communication quality. It may be understood that the second communication device indicates the first communication device to enable the SL DRX, to help reduce power consumption of the sidelink. In addition, the second communication device indicates the first communication device to disable the SL DRX, to increase resource scheduling efficiency (or resource utilization) of the first communication device, and ensure quality of the service sent by the first communication device to the second communication device.

Figure 5:
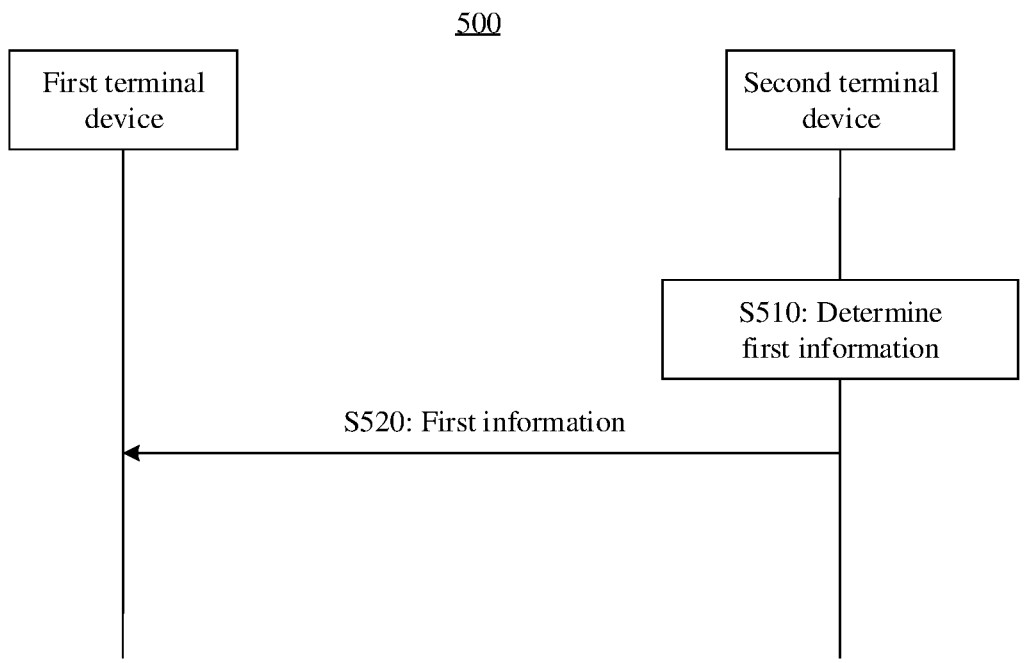
FIG. 5 is a schematic interaction diagram of a communication method 500 according to an embodiment of this application.

FIG. 5 is a schematic interaction diagram of a communication method 500 according to an embodiment of this application. It may be understood that a portion or all of information exchanged between devices in FIG. 5 may be carried in an existing message, channel, signal, or existing signaling, or may be a newly defined message, channel, signal, or newly defined signaling. This is not specifically limited herein. The method 500 includes the following steps.

S510: A second terminal device determines first information. The first information includes SL DRX cycle adjustment indication information, the SL DRX cycle adjustment indication information is used to adjust an SL DRX cycle of a first sidelink, and the first sidelink is a sidelink between a first communication device and a second communication device. A first terminal device is a transmit end, and the second terminal device is a receive end.

In a possible manner, the second terminal device determines the first information based on third service-related information. The first information includes the SL DRX cycle adjustment indication information, the SL DRX cycle adjustment indication information is related to a cycle adjustment value and a cycle reference value, and the third service-related information is service-related information of the second terminal device.

Optionally, the third service-related information includes delay requirement information of a current service, actual transmission status information, a current delay budget, or the like. The actual transmission status information may include service arrival time information. In other words, the second terminal device may determine the SL DRX cycle adjustment value based on one or more of a delay requirement, the delay budget, and an actual transmission status of the current service.

Optionally, in a possible implementation, the cycle adjustment indication information is related to the cycle adjustment value and the cycle reference value, and it may be understood that the cycle adjustment indication information includes the cycle adjustment value and the cycle reference value. The cycle reference value may be understood as a basic unit of cycle adjustment. For example, the reference values are 20, 40, 60 . . . . The adjustment value may be 0 or 1. When the adjustment value is 1, it indicates that the reference value is doubled. When the adjustment value is 0, it indicates that the reference value is halved. It may be understood that there may be another corresponding rule between the cycle adjustment value and the cycle reference value. For example, there is a function relationship between the reference value and the adjustment value. This is not limited in this embodiment of this application.

Optionally, in a possible implementation, the cycle adjustment indication information is related to the cycle adjustment value and the cycle reference value, and it may be understood that the cycle adjustment indication information includes the cycle adjustment value and the cycle reference value. The cycle reference value is preconfigured, and there is a correspondence between the cycle adjustment value and the cycle reference value. In this embodiment of this application, the cycle reference value may be preconfigured in a plurality of implementations, and one of the implementations may be preconfiguration or predefinition. In another preconfiguration implementation, configuration and indication may be performed by using an RRC reconfiguration message, a MAC CE, or SCI. Optionally, the network device first configures or indicates the first terminal device, and then the first terminal device configures or indicates the second terminal device. Alternatively, the first terminal device configures or indicates the second terminal device, or the second terminal device configures or indicates the first terminal device. This is not limited in this embodiment of this application.

For example, the first terminal device and the second terminal device preconfigure the cycle reference value, the first information includes the cycle adjustment value, and the cycle adjustment value is related to (has a correspondence with) the preconfigured cycle reference value.

S520: The second terminal device sends the first information to the first terminal. Correspondingly, the first terminal receives the first information, and adjusts the SL DRX cycle based on the first information.

In this embodiment of this application, an SL DRX cycle adjustment amount is decomposed into two parameters (the cycle adjustment value and the cycle reference value), to overcome a limitation on an amount of information fed back by the terminal device. This improves user experience.

Figure 6:
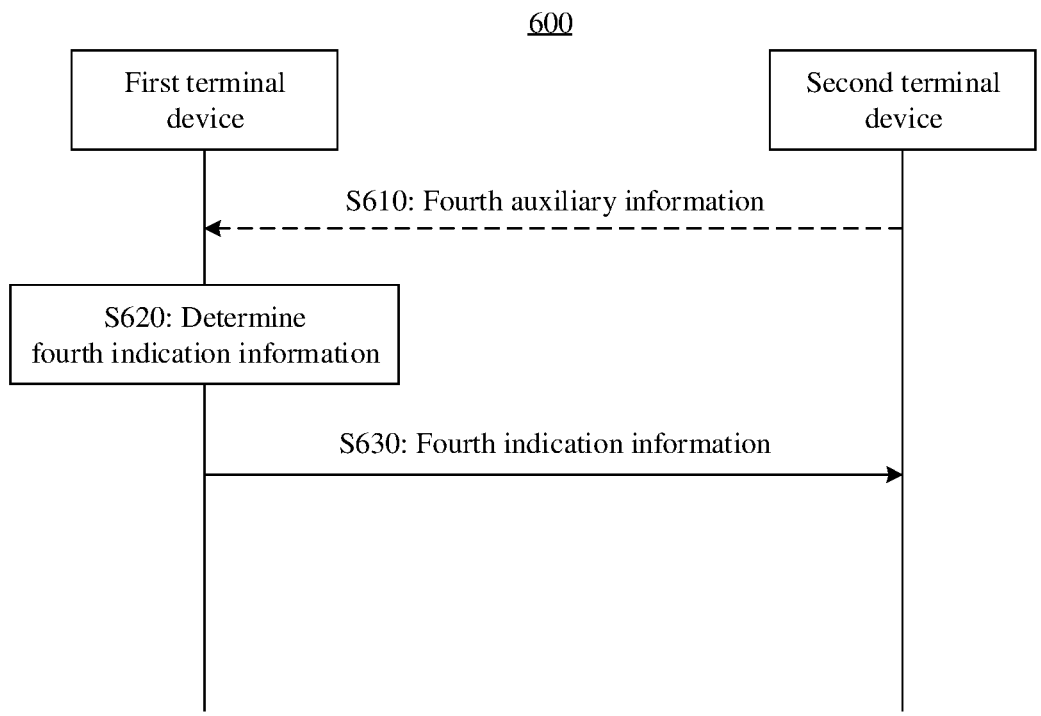
FIG. 6 is a schematic interaction diagram of a communication method 600 according to an embodiment of this application.

FIG. 6 is a schematic interaction diagram of a communication method 600 according to an embodiment of this application. It may be understood that a portion or all of information exchanged between devices in FIG. 6 may be carried in an existing message, channel, signal, or existing signaling, or may be a newly defined message, channel, signal, or newly defined signaling. This is not specifically limited herein. The method 600 includes the following steps.

S620: A first terminal device determines fourth indication information, where the fourth indication information indicates an enabling operation determined for a first sidelink, the enabling operation includes enabling a sidelink user equipment power saving signal (SL UPSS) configuration for the first sidelink, or disabling an SL UPSS configuration for the first sidelink, and the first sidelink is a sidelink between the first terminal device and a second terminal device. The first terminal device is a transmit end, and the second terminal device is a receive end.

Optionally, the method 600 further includes: S610: The first terminal device receives fourth auxiliary information sent by the second terminal device, where the fourth auxiliary information includes one or more of power percentage information, a power level, sufficient power indication information, power saving type information of a terminal device, and resource configuration information that are of the second terminal device. The first terminal device determines the fourth indication information based on the fourth auxiliary information.

In a possible implementation, the method 600 further includes: The first terminal device sends fourth auxiliary feedback indication information to the second terminal device, where the fourth auxiliary feedback indication information indicates the second terminal device to send the fourth auxiliary information to the first terminal device.

Optionally, the first terminal device determines the fourth indication information based on the fourth auxiliary information.

For example, if the power percentage information in the fourth auxiliary information is greater than a preset threshold, the first terminal device determines to disable the SL UPSS configuration. Otherwise, if the power percentage information in the fourth auxiliary information is less than the preset threshold, the first terminal device determines to enable the SL UPSS configuration.

Optionally, if the sufficient power indication information in the fourth auxiliary information indicates that power is sufficient, the first terminal device determines to disable the SL UPSS configuration. Otherwise, if the sufficient power indication information in the fourth auxiliary information indicates that power is insufficient or power is very low, the first terminal device determines to enable the SL UPSS configuration. It may be understood that a condition for determining sufficient power may be comparing with a preset power.

Optionally, if the power saving type information of the terminal device in the fourth auxiliary information is a non-power saving type, the first terminal device determines to disable the SL UPSS configuration. Otherwise, if the power saving type information of the terminal device in the fourth auxiliary information is a power saving type, the first terminal device determines to enable the SL UPSS configuration.

Optionally, the fourth indication information further includes synchronization indication information, and the synchronization indication information is used for synchronously enabling or disabling the SL UPSS configuration and the SL DRX configuration.

S630: The first terminal device sends the fourth indication information to the second terminal device. Correspondingly, the second terminal device receives the fourth indication information sent by the first terminal device.

In this embodiment of this application, the first terminal device determines, based on the auxiliary information fed back by the second terminal device, the fourth indication information that indicates the enabling operation of the SL UPSS configuration for the first sidelink. This ensures consistency of enabling of the SL UPSS configuration between the first terminal device and the second terminal device.

An embodiment of this application provides a communication method 700. The method 700 includes the following steps.

S740: A network device determines fifth indication information. The fifth indication information indicates an enabling operation of an SL UPSS configuration determined for a first sidelink. The first sidelink is a sidelink between a first terminal device and a second terminal device. The first terminal device is a transmit end, and the second terminal device is a receive end.

Optionally, the method 700 further includes: S730: The network device receives fifth service-related information sent by the first terminal device, where the fifth service-related information is service-related information between the first terminal device and the second terminal device. The network device determines the fifth indication information based on the fifth service-related information. For manners of sending and carrying the fifth service-related information, refer to related descriptions in S330.

Optionally, the communication method 700 further includes: The network device sends fifth service-related feedback indication information to the first terminal, where the fifth service-related feedback indication information indicates to send the fifth service-related information to the network device. It may be understood that the fifth service-related feedback indication information and the first service-related feedback indication information in the method 300 may be one piece of information, or may be a plurality of pieces of information.

Optionally, the communication method 700 further includes: S720: The network device receives fifth auxiliary information sent by the first terminal device, where the fifth auxiliary information includes one or more of power percentage information, a power level, sufficient power indication information, power saving type information of a terminal device, and resource configuration information that are of the second terminal device. The network device determines the fifth indication information based on the fifth auxiliary information. An implementation is similar to that described in S320, and details are not described again in this embodiment of this application.

Optionally, the communication method 700 further includes: S710: The first terminal device receives fifth auxiliary information sent by the second terminal device, where the fifth auxiliary information includes one or more of power percentage information, a power level, sufficient power indication information, power saving type information of a terminal device, SL DRX adjustment value information with null content, indication information for enabling or disabling an SL DRX configuration, and resource configuration information that are of the second terminal device.

S750: The network device sends the fifth indication information to the first terminal device, where the fifth indication information indicates the enabling operation of the SL UPSS configuration determined for the first sidelink. Correspondingly, the first terminal device receives the fifth indication information from the network device. In other words, the network device may send, to the first terminal device, the enabling operation of the SL UPSS configuration determined for the first sidelink.

S760: The first terminal device sends the fifth indication information to the second terminal device, and correspondingly, the second terminal device receives the fifth indication information from the first terminal. In other words, the first terminal device may send, to the second terminal device, the enabling operation of the SL DRX configuration determined for the first sidelink.

For implementations of S750 and S760, refer to the descriptions in S350 and S360.

An embodiment of this application provides a communication method 800. The method 800 includes the following steps.

S830: The second terminal device determines sixth indication information, where the sixth indication information indicates an enabling operation determined for the first sidelink, and the first sidelink is a sidelink between a first terminal device and the second terminal device. The first terminal device is a transmit end, and the second terminal device is a receive end.

In this embodiment of this application, determining the sixth indication information by the second terminal device may be understood as that the second terminal device determines to enable or disable an SL UPSS configuration.

Optionally, the method 800 further includes: S820: The second terminal device receives sixth auxiliary information sent by the first terminal device, where the sixth auxiliary information includes one or more of the following information: service-related information and resource configuration information that are between the first terminal device and the second terminal device.

Optionally, for a manner in which the second terminal device determines the sixth indication information based on the service-related information and/or the resource configuration information in the sixth auxiliary information, refer to the descriptions in S420 in the method 400.

Optionally, the method further includes: S810: The second terminal device sends sixth auxiliary feedback indication information to the first terminal device, and correspondingly, the first terminal device receives the sixth auxiliary feedback indication information. An implementation is similar to the implementation in S410 in the method 400.

S840: The second terminal device sends the sixth indication information to the first terminal device, and correspondingly, the first terminal device receives the sixth indication information. A manner of sending the sixth indication information is similar to that described in S440. It may be understood that the third indication information and the sixth indication information in this embodiment of this application may be independent information, or may be one piece of information, that is, the indication information may indicate enabling operations of both SL DRX and SL UPSS.

In embodiments of this application, indication information (the first indication information, the second indication information, the third indication information, and/or the fourth indication information) for enabling a configuration (the SL DRX configuration and/or the SL UPSS configuration) further includes an identifier of a sidelink, an identifier of a single communication device, or an identifier of a communication device pair. To be specific, the first indication information may further include an identifier of the first sidelink, or an identifier of a first communication device (the first terminal device), or an identifier of a second communication device (the second terminal device), or the identifier of the communication device pair (a terminal device pair), namely, the identifier of the terminal device pair including the first terminal device and the second terminal device.

Optionally, the indication information for enabling the configuration and corresponding identifier information may be separately sent. In other words, the indication information and the corresponding identifier information may be one piece of information, or may be included in a plurality of pieces of information. This is not limited in embodiments of this application.

The indication information for enabling the configuration includes the first indication information determined by the first terminal device, the second indication information determined by the second terminal device, the third indication information determined by the network device, and/or the fourth indication information determined by the first terminal device. That is, in embodiments of this application, when the network device indicates specific transmit end UE, or specific transmit end UE indicates specific receive end UE, or specific receive end UE indicates specific transmit end UE to enable/disable the SL DRX configuration and/or the SL UPSS configuration, a corresponding SL link identifier, a single UE ID, or a UE ID pair is also indicated.

In embodiments of this application, the identifier of the single communication device (for example, the first terminal device) may include one or more of a temporary mobile subscriber identity (serving-temporary mobile subscriber identity, S-TMSI), an international mobile subscriber identity (IMSI), a subscription hidden identifier (subscription permanent identifier, SUPI), a globally unique temporary UE identity (GUTI), or a layer 1 identifier (or a layer 2 identifier) of the first communication apparatus. The identifier of the second terminal device may include one of an S-TMSI, an IMSI, an SUPI, or a GUTI of the second terminal device or a layer 1 identifier (or a layer 2 identifier) of the second terminal device.

When an identifier (ID) of a terminal device uses a layer 1 identifier (L1 UE ID) or a layer 2 identifier (L2 UE ID), the identifier of the terminal device pair may include a source layer 2 identifier and a destination layer 2 identifier: {source L2 ID, destination L2 ID}; or the identifier of the terminal device pair may include a source layer 1 identifier and a destination layer 1 identifier: {source L1 ID, destination L1 ID}.

Optionally, for SL unicast, an identifier included in the indication information for enabling the configuration may be the identifier of the second terminal device, or a destination layer 1 or layer 2 identifier in a UE ID pair is the identifier of the second terminal device.

Optionally, for SL multicast or SL broadcast, an identifier included in the indication information for enabling the configuration may be a destination L2 ID or a destination L1 ID associated with a service of the SL multicast or SL broadcast. Different from the SL unicast, the destination L2 ID or the destination L1 ID of the SL multicast or SL broadcast herein is not the identifier of the second terminal device. Similarly, the identifier of the terminal device pair may alternatively be the destination L2 ID or the destination L1 ID associated with the service of the SL multicast or SL broadcast.

It may be understood that in embodiments of this application, the first terminal device is a terminal device at the transmit end, and the second terminal device is a terminal device at the receive end.

In this implementation, a sidelink corresponding to the indication information for enabling the configuration, or a single terminal device or a terminal device pair corresponding to the indication information for enabling the configuration may be identified, to facilitate a correspondence between indication information and a sidelink.

In this embodiment of this application, in a possible implementation, the communication method further includes synchronization indication information, where the synchronization indication information indicates to synchronously enable or disable the SL UPSS configuration and the SL DRX configuration. Optionally, the synchronization indication information and the SL DRX enabling indication information are sent simultaneously. The synchronization indication information may be included in SL DRX indication information, or may be sent independently. In other words, the synchronization indication information and the SL DRX indication information may be one piece of information, or may be sent simultaneously in a plurality of pieces of information.

Similarly, the synchronization indication information may alternatively be included in the SL UPSS indication information, or the SL UPSS indication information and the SL DRX indication information may be a same piece of indication information, or may be a plurality of pieces of indication information, and may be sent simultaneously or sequentially. This is not limited in embodiments of this application. It may be understood that in a possible implementation, that the SL UPSS indication information and the SL DRX indication information are sent simultaneously is predefined in a protocol. In other words, the SL UPSS indication information and the SL DRX indication information are sent simultaneously by default, or one piece of indication information indicates both an enabling operation of the SL UPSS and an enabling operation of the SL DRX. It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions.

It should be understood that the solutions in embodiments of this application may be properly combined for use, and explanations or descriptions of terms in the embodiments may be cross-referenced or explained in the embodiments. This is not limited.

It should further be understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of embodiments of this application.

Corresponding to the method provided in the foregoing method embodiment, an embodiment of this application further provides a corresponding apparatus. The apparatus includes a corresponding module configured to perform the foregoing embodiment. The module may be software, hardware, or a combination of software and hardware. It may be understood that the technical features described in the method embodiments are also applicable to the following apparatus embodiments.

Figure 7:
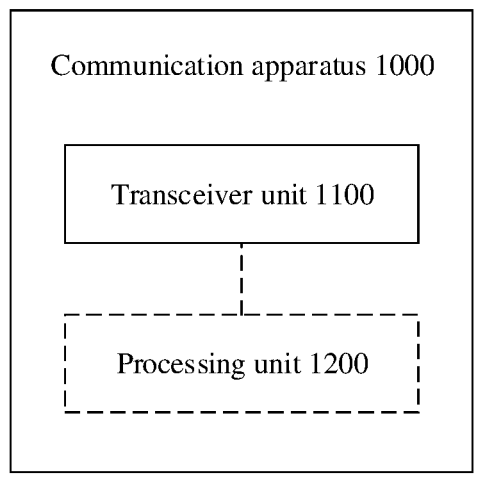
FIG. 7 is a schematic block diagram of a communication apparatus according to an embodiment of this application.

FIG. 7 is a schematic block diagram of a communication apparatus according to an embodiment of this application. As shown in FIG. 7, the communication apparatus 1000 may include a transceiver unit 1100. Optionally, the communication apparatus 1000 may further include a processing unit 1200.

In a possible design, the communication apparatus 1000 may correspond to the terminal device in the foregoing method embodiments, for example, may be a terminal device, or may be a chip disposed in the terminal device.

Specifically, the communication apparatus 1000 may correspond to the first terminal device in the method 200, the method 300, the method 400, the method 500, or the method 600 according to embodiments of this application. The communication apparatus 1000 may include units configured to perform the method performed by the first terminal device in the method 200 in FIG. 2, the method 300 in FIG. 3, the method 400 in FIG. 4, the method 500 in FIG. 5, or the method 600 in FIG. 6. In addition, the units in the communication apparatus 1000 and the foregoing other operations or functions are separately used for implementing a corresponding procedure of the first terminal device in the method 200 in FIG. 2, the method 300 in FIG. 3, the method 400 in FIG. 4, the method 500 in FIG. 5, or the method 600 in FIG. 6.

In an implementation, the processing unit 1200 may be configured to determine first indication information, where the first indication information indicates an enabling operation determined for a first sidelink, the enabling operation includes enabling a sidelink discontinuous reception SL DRX configuration for the first sidelink, or disabling an SL DRX configuration for the first sidelink, and the first sidelink is a sidelink between a first terminal device and a second terminal device.

Optionally, the transceiver unit 1100 may be configured to send the first indication information to the second terminal device.

Optionally, the transceiver unit 1100 is further configured to receive first auxiliary information sent by the second terminal device, where the first auxiliary information includes one or more of power percentage information, a power level, sufficient power indication information, power saving type information of a terminal device, SL DRX adjustment value information with null content, indication information for enabling or disabling an SL DRX configuration, and resource configuration information that are of the second terminal device. The processing unit 1200 is further configured to determine the first indication information based on the first auxiliary information.

Optionally, the transceiver unit 1100 is further configured to send first auxiliary feedback indication information to the second terminal device, where the first auxiliary feedback indication information indicates the second terminal device to send auxiliary information related to the SL DRX configuration to the first terminal device.

Optionally, the processing unit 1200 is further configured to determine the first indication information based on fourth service-related information, where the fourth service-related information is service-related information between the first terminal device and the second terminal device.

Optionally, the transceiver unit 1100 may be configured to send first enabling indication information to the second terminal device, where the first enabling indication information indicates to enable the SL DRX configuration for the first sidelink.

Optionally, the transceiver unit 1100 may be configured to send first disabling indication information to the second terminal device, where the first disabling indication information indicates to enable the SL DRX configuration for the first sidelink.

In another implementation, the transceiver unit 1100 and the processing unit 1200 may be separately configured to:

The transceiver unit 1100 is configured to receive second indication information sent by a network device, where the second indication information indicates an enabling operation determined for a first sidelink, the enabling operation includes enabling an SL DRX configuration for the first sidelink, or disabling an SL DRX configuration for the first sidelink, and the first sidelink is a sidelink between a first terminal device and a second terminal device.

Optionally, the transceiver unit 1100 is further configured to send the second indication information to the second terminal device.

Optionally, the transceiver unit 1100 is further configured to send first service-related information to the network device, where the first service-related information is service-related information between the first terminal device and the second terminal device.

Optionally, the transceiver unit 1100 is further configured to receive first service-related feedback indication information sent by the network device, where the first service-related feedback indication information indicates to send the first service-related information to the network device.

Optionally, the transceiver unit 1100 is further configured to receive second enabling indication information sent by the network device, where the second enabling indication information indicates to enable the SL DRX configuration for the first sidelink.

Optionally, the transceiver unit 1100 is further configured to receive second disabling indication information sent by the network device, where the second enabling indication information indicates to disable the SL DRX configuration for the first sidelink.

In another implementation, the transceiver unit 1100 and the processing unit 1200 may be separately configured to:

The transceiver unit 1100 is configured to receive third indication information sent by a second terminal device, where the third indication information indicates an enabling operation determined for a first sidelink, the enabling operation includes enabling a sidelink discontinuous reception SL DRX configuration for the first sidelink, or disabling an SL DRX configuration for the first sidelink, and the first sidelink is a sidelink between a first terminal device and the second terminal device.

The processing unit 1200 is configured to determine, based on the third indication information, the enabling operation for the first sidelink.

Optionally, the transceiver unit 1100 is further configured to send third auxiliary related information to the second terminal device, where the third auxiliary information includes one or more of the following information: service-related information and resource configuration information that are between the first terminal device and the second terminal device.

Optionally, the transceiver unit 1100 is further configured to receive third enabling indication information sent by the second terminal device, where the third enabling indication information indicates to enable the SL DRX configuration for the first sidelink.

Optionally, the transceiver unit 1100 is further configured to receive third disabling indication information sent by the second terminal device, where the third disabling indication information indicates to disable the SL DRX configuration for the first sidelink.

In another implementation, the transceiver unit 1100 and the processing unit 1200 may be separately configured to:

The transceiver unit 1100 is configured to receive first information sent by a second terminal device, where the first information includes SL DRX cycle adjustment indication information, and the SL DRX cycle adjustment indication information is related to a cycle adjustment value and a cycle reference value.

The processing unit 1200 is configured to adjust an SL DRX cycle based on the first information.

In another implementation, the transceiver unit 1100 and the processing unit 1200 may be separately configured to:

The processing unit 1200 is configured to determine fourth indication information, where the fourth indication information indicates an enabling operation determined for a first sidelink, the enabling operation includes enabling a sidelink user equipment power saving signal SL UPSS configuration for the first sidelink, or disabling an SL UPSS configuration for the first sidelink, and the first sidelink is a sidelink between a first terminal device and a second terminal device.

The transceiver unit 1100 is configured to send the fourth indication information to the second terminal device.

Optionally, the transceiver unit 1100 is further configured to receive fourth auxiliary information of the second terminal device, where the fourth auxiliary information includes one or more of power percentage information, a power level, sufficient power indication information, power saving type information of a terminal device, and resource configuration information that are of the second terminal device.

Optionally, the processing unit 1200 is further configured to determine the fourth indication information based on the fourth auxiliary information.

Specifically, the communication apparatus 1000 may correspond to the second terminal device in the method 200, the method 300, the method 400, the method 500, or the method 600 according to embodiments of this application. The communication apparatus 1000 may include units configured to perform the method performed by the second terminal device in the method 200 in FIG. 2, the method 300 in FIG. 3, the method 400 in FIG. 4, the method 500 in FIG. 5, or the method 600 in FIG. 6. In addition, the units in the communication apparatus 1000 and the foregoing other operations or functions are separately used for implementing a corresponding procedure of the second terminal device in the method 200 in FIG. 2, the method 300 in FIG. 3, the method 400 in FIG. 4, the method 500 in FIG. 5, or the method 600 in FIG. 6.

In a possible implementation, the transceiver unit 1100 is configured to receive first indication information sent by a first terminal device, where the first indication information indicates an enabling operation selected for a first sidelink, the enabling operation includes enabling a sidelink discontinuous reception SL DRX configuration for the first sidelink, or disabling an SL DRX configuration for the first sidelink, and the first sidelink is a sidelink between the first terminal device and a second terminal device.

The processing unit 1200 is configured to determine, based on the first indication information, the enabling operation for the first sidelink.

Optionally, the transceiver unit 1100 is further configured to send first auxiliary information to the first terminal device, where the first auxiliary information includes one or more of power percentage information, a power level, sufficient power indication information, power saving type information of a terminal device, SL DRX adjustment value information with null content, indication information for enabling or disabling an SL DRX configuration, and resource configuration information that are of the second terminal device.

Optionally, the transceiver unit 1100 is further configured to receive first auxiliary feedback indication information, where the first auxiliary feedback indication information indicates the second terminal device to send the auxiliary information related to the SL DRX configuration to the first terminal device.

Optionally, the transceiver unit 1100 is further configured to receive the first auxiliary feedback indication information sent by the network device.

Optionally, the processing unit 1200 is further configured to determine, based on the auxiliary information related to the SL DRX configuration, to send the first auxiliary information to the first terminal device, where the auxiliary information related to the SL DRX configuration is auxiliary reference information related to the SL DRX configuration.

Optionally, the transceiver unit 1100 is further configured to receive first enabling indication information sent by the first terminal device, where the first enabling indication information indicates to enable the SL DRX configuration for the first sidelink.

Optionally, the transceiver unit 1100 is further configured to receive first disabling indication information sent by the first terminal device, where the first disabling indication information indicates to disable the SL DRX configuration for the first sidelink.

In another implementation, the transceiver unit 1100 and the processing unit 1200 may be separately configured to:

The transceiver unit 1100 is configured to receive second indication information sent by a first terminal device, where the second indication information indicates an enabling operation determined for a first sidelink, the enabling operation includes enabling an SL DRX configuration for the first sidelink, or disabling an SL DRX configuration for the first sidelink, and the first sidelink is a sidelink between the first terminal device and a second terminal device.

The processing unit 1200 is configured to determine, based on the second indication information, the enabling operation for the first sidelink.

Optionally, the transceiver unit 1100 is further configured to send second auxiliary information to the first terminal device, where the second auxiliary information includes one or more of power percentage information, a power level, sufficient power indication information, power saving type information of a terminal device, SL DRX adjustment value information with null content, indication information for enabling or disabling an SL DRX configuration, and resource configuration information that are of the second terminal device.

Optionally, the transceiver unit 1100 is further configured to receive second auxiliary feedback indication information, where the second auxiliary feedback indication information indicates the second terminal device to send the auxiliary information related to the SL DRX configuration to the first terminal device.

Optionally, the transceiver unit 1100 is further configured to receive the second auxiliary feedback indication information sent by the network device.

Optionally, the processing unit 1200 is further configured to determine, based on the auxiliary information related to the SL DRX configuration, to send the second auxiliary information to the first terminal device.

Optionally, the transceiver unit 1100 is further configured to receive second enabling indication information sent by the first terminal device, where the second enabling indication information indicates to disable the SL DRX configuration for the first sidelink.

Optionally, the transceiver unit 1100 is further configured to receive second disabling indication information sent by the first terminal device, where the second disabling indication information indicates to disable the SL DRX configuration for the first sidelink.

In another implementation, the transceiver unit 1100 and the processing unit 1200 may be separately configured to:

The processing unit 1200 is configured to determine third indication information, where the third indication information indicates an enabling operation determined for a first sidelink, the enabling operation includes enabling a sidelink discontinuous reception SL DRX configuration for the first sidelink, or disabling an SL DRX configuration for the first sidelink, and the first sidelink is a sidelink between a first terminal device and a second terminal device.

The transceiver unit 1100 is configured to send the third indication information to the first terminal device.

Optionally, the transceiver unit 1100 is further configured to receive third auxiliary information sent by the first terminal device, where the third auxiliary information includes one or more of the following information: service-related information and resource configuration information that are between the first terminal device and the second terminal device.

Optionally, the processing unit 1200 is further configured to determine the third indication information based on the third auxiliary information.

Optionally, the processing unit 1200 is further configured to determine the third indication information based on service-related information of the second terminal device, where the service-related information of the second terminal device includes a requirement for sending a service.

Optionally, the transceiver unit 1100 is further configured to send third enabling indication information to the first terminal device, where the third enabling indication information indicates to enable the SL DRX configuration for the first sidelink.

Optionally, the transceiver unit 1100 is further configured to send third disabling indication information to the first terminal device, where the third disabling indication information indicates to disable the SL DRX configuration for the first sidelink.

In another implementation, the transceiver unit 1100 and the processing unit 1200 may be separately configured to:

The processing unit is configured to determine first information, where the first information includes SL DRX cycle adjustment indication information, the SL DRX cycle adjustment indication information is used to adjust an SL DRX cycle of a first sidelink, and the first sidelink is a sidelink between a first communication device and a second communication device.

The processing unit 1200 is further configured to determine the first information based on third service-related information, where the first information includes SL DRX cycle adjustment indication information, the SL DRX cycle adjustment indication information is related to a cycle adjustment value and a cycle reference value, and the third service-related information is service-related information of the second terminal device.

The transceiver unit 1100 is configured to send the first information to the first terminal device. Optionally, the first information includes an SL DRX cycle adjustment value and an SL DRX cycle reference value. Optionally, the first information includes an SL DRX cycle adjustment value.

In another implementation, the transceiver unit 1100 and the processing unit 1200 may be separately configured to:

The transceiver unit 1100 is configured to receive fourth indication information sent by a first terminal device, where the fourth indication information indicates an enabling operation determined for a first sidelink, the enabling operation includes enabling an SL UPSS configuration for the first sidelink, or disabling an SL UPSS configuration for the first sidelink, and the first sidelink is a sidelink between the first terminal device and a second terminal device.

The processing unit 1200 is configured to determine, based on the fourth indication information, the enabling operation for the first sidelink.

Optionally, the transceiver unit 1100 is further configured to send fourth auxiliary information to the first terminal device, where the fourth auxiliary information includes one or more of power percentage information, a power level, sufficient power indication information, power saving type information of a terminal device, and resource configuration information that are of the second terminal device.

It should be understood that a specific process of performing a corresponding step by each unit has been described in detail in the foregoing method embodiments. For brevity, details are not described herein again.

Figure 8:
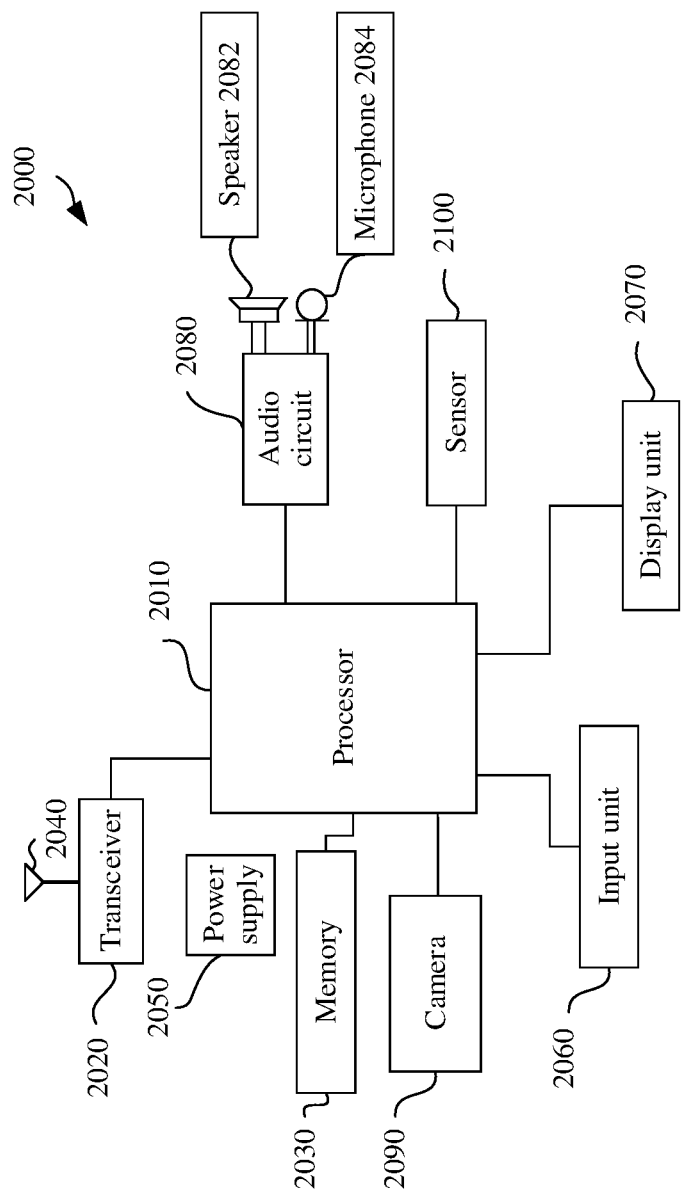
FIG. 8 is a schematic diagram of a structure of a terminal device according to an embodiment of this application.

It should be further understood that when the communication apparatus 1000 is a terminal device (the first terminal device or the second terminal device), the transceiver unit 1100 in the communication apparatus 1000 may correspond to a transceiver 2020 in a terminal device 2000 shown in FIG. 8, and the processing unit 1200 in the communication apparatus 1000 may correspond to a processor 2010 in the terminal device 2000 shown in FIG. 8.

It should be further understood that, when the communication apparatus 1000 is the chip disposed in the terminal device, the transceiver unit 1200 in the communication apparatus 1000 may be an input/output interface circuit.

In another possible design, the communication apparatus 1000 may correspond to the network device in the foregoing method embodiments, for example, may be a network device, or may be a chip disposed in a network device.

Specifically, the communication apparatus 1000 may correspond to the network device in the method 300 according to embodiments of this application. The communication apparatus 1000 may include units configured to perform the method performed by the network device in the method 300 in FIG. 3. In addition, the units in the communication apparatus 1000 and the foregoing other operations and/or functions are separately used to implement corresponding procedures of the network device in the method 300 in FIG. 3.

In an implementation, the transceiver unit 1100 and the processing unit 1200 may be separately configured to:

The processing unit 1200 is configured to determine second indication information, where the second indication information indicates an enabling operation determined for a first sidelink, the enabling operation includes enabling an SL DRX configuration for the first sidelink, or disabling an SL DRX configuration for the first sidelink, and the first sidelink is a sidelink between a first terminal device and a second terminal device.

The transceiver unit 1100 is configured to send the second indication information to the first terminal device.

Optionally, the transceiver unit 1100 is further configured to receive first service-related information sent by the first terminal device, where the first service-related information is service-related information between the first terminal device and the second terminal device.

Optionally, the processing unit 1200 is further configured to determine the second indication information based on the first service-related information.

Optionally, the transceiver unit 1100 is further configured to send first service-related feedback indication information to the first terminal device, where the first service-related feedback indication information indicates to send the first service-related information to the network device.

Optionally, the transceiver unit 1100 is further configured to receive second auxiliary information sent by the first terminal device, where the second auxiliary information includes one or more of power percentage information, a power level, sufficient power indication information, power saving type information of a terminal device, SL DRX adjustment value information with null content, indication information for enabling or disabling an SL DRX configuration, and resource configuration information that are of the second terminal device.

Optionally, the processing unit 1200 is further configured to determine the second indication information based on the second auxiliary information.

Optionally, the transceiver unit 1100 is further configured to send second auxiliary feedback indication information to the first terminal device, where the second auxiliary feedback indication information indicates the first terminal device to send SL DRX-related auxiliary information to the network device.

Optionally, the transceiver unit 1100 is further configured to send second enabling indication information to the first terminal device, where the second enabling indication information indicates to enable the SL DRX configuration for the first sidelink.

Optionally, the transceiver unit 1100 is further configured to send second disabling indication information to the first terminal device. The second enabling indication information indicates to disable the SL DRX configuration for the first sidelink.

It should be understood that a specific process of performing a corresponding step by each unit has been described in detail in the foregoing method embodiments. For brevity, details are not described herein again.

It should be further understood that, when the communication apparatus 1000 is the network device (the first network device or the second network device), the transceiver unit 1100 in the communication apparatus 1000 may correspond to a transceiver 2020 in a terminal device 2000 shown in FIG. 8, and the processing unit 1200 in the communication apparatus 1000 may correspond to a processor 2010 in the terminal device 2000 shown in FIG. 8.

It should be further understood that, when the communication apparatus 1000 is a chip configured in the network device, the transceiver unit 1200 in the communication apparatus 1000 may be an input/output interface circuit.

FIG. 8 is a schematic diagram of a structure of a terminal device 2000 according to an embodiment of this application. The terminal device 2000 may be applied to the system shown in FIG. 1, to perform functions of the terminal device (the first terminal device or the second terminal device) in the foregoing method embodiments. As shown in FIG. 8, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal or a data signal. The memory 2030 is configured to store a computer program. The processor 2010 is configured to invoke the computer program from the memory 2030 and run the computer program, to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 7.

The transceiver 2020 may correspond to the communication unit in FIG. 7, and may also be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 2000 shown in FIG. 8 can implement processes related to the terminal device (the first terminal device or the second terminal device) in the method embodiments shown in FIG. 2 to FIG. 6. Operations or functions of modules in the terminal device 2000 are intended to implement corresponding processes in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments. The transceiver 2020 may be configured to perform a sending action by the terminal device for the network device or a receiving operation from the network device in the foregoing method embodiments. For details, refer to the descriptions in the foregoing method embodiments. Details are not described herein.

Optionally, the terminal device 2000 may further include a power supply 2050, configured to supply power to various components or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

According to the methods provided in the embodiments of this application, this application further provides a computer program product. The computer program product includes computer program code. When the computer program code is run on a computer, the computer is enabled to perform the method on a terminal device side (a first terminal device or a second terminal device) in embodiments shown in FIG. 2 to FIG. 6.

According to the methods provided in the embodiments of this application, this application further provides a computer-readable medium. The computer-readable storage medium stores program code. When the program code is run on a computer, the computer is enabled to perform the method on a network device side (a first network device or a second network device) in embodiments shown in FIG. 2 to FIG. 6.

According to the method provided in embodiments of this application, this application further provides a system. The system includes the foregoing one or more terminal devices (for example, the first terminal device and the second terminal device) and one or more network devices (for example, the first network device and the second network device).

An embodiment of this application further provides a processing apparatus, including a processor and an interface. The processor is configured to perform the communication method in any one of the foregoing method embodiments.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions. Details are not described herein.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the scope of embodiments of this application.

It should be understood that the processor in this embodiment of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a digital signal processing circuit (DSP), a microcontroller (MCU), a programmable controller (PLD), or another integrated chip. The processor may implement or perform the methods, the steps, and the logical block diagrams that are disclosed in embodiments of this application. The general-purpose processor may be a microprocessor, or any conventional processor, or the like. The steps of the method disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the method in combination with hardware of the processor.

The technologies described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, a discrete gate or transistor logic device, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that, in embodiments of this application, the memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and method described in this specification includes but is not limited to these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

According to the methods provided in embodiments of this application, this application further provides a system. The system includes the foregoing one or more terminal devices and the foregoing one or more network devices.

All or some of embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center that integrates one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that, an "embodiment" mentioned throughout this specification means that particular features, structures, or characteristics related to this embodiment are included in at least one embodiment of this application. Therefore, embodiments in the entire specification are not necessarily same embodiments. In addition, these particular features, structures, or characteristics may be combined in one or more embodiments in any proper manner. It should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

It should be further understood that, in this application, "when" and "if" mean that UE or a base station performs corresponding processing in an objective situation, and are not intended to limit time, and the UE or the base station is not necessarily required to have a determining action during implementation, and do not mean any other limitation.

A person of ordinary skill in the art may understand that various numerals such as "first" and "second" in this application are merely used for differentiation for ease of description, and are not used to limit the scope of embodiments of this application or represent a sequence.

In this application, unless otherwise specified, an element represented in a singular form is intended to represent "one or more", but is not intended to represent "only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

The character "/" generally represents an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B and C all exist. A may be singular or plural, B may be singular or plural, and C may be singular or plural.

It should be understood that in embodiments of this application, "B corresponding to A" indicates that B is associated with A, and B may be determined based on A. However, it should be further understood that determining B based on A does not mean that B is determined based only on A, that is, B may alternatively be determined based on A and/or other information.

For unified description herein, "predefine" in embodiments of this application may be understood as "define", "predefine", "store", "pre-store", "pre-negotiate", "pre-configure", "solidify", or "pre-burn". The configuration in embodiments of this application may be understood as notification by using RRC signaling, MAC signaling, or physical layer information. The physical layer information may be transmitted through a PDCCH, a physical downlink shared channel (PDSCH), a physical sidelink control channel (PSCCH), or a physical sidelink shared channel (PSSCH).

A person of ordinary skill in the art may be aware that, the units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. A portion or all of the units may be selected according to actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication method, comprising:
   receiving, by a first communication device, first auxiliary information sent by a second communication device, wherein the first auxiliary information comprises one or more of power percentage information, sufficient power indication information, power saving type information of a terminal device, sidelink discontinuous reception (SL DRX) adjustment value information with null content, indication information for enabling or disabling an SL DRX configuration, and resource configuration information that are of the second communication device;
   determining, by the first communication device, first indication information comprising a request to perform an enabling operation for a first sidelink, wherein the enabling operation comprises enabling a SL DRX configuration for the first sidelink, or disabling an SL DRX configuration for the first sidelink, and the first sidelink is a sidelink between the first communication device and the second communication device; and
   sending, by the first communication device, the first indication information to the second communication device.

2. The communication method according to claim 1, further comprising:
   sending, by the first communication device, first auxiliary feedback indication information to the second communication device, wherein the first auxiliary feedback indication information requests the second communication device to send the first auxiliary information to the first communication device.

3. The communication method according to claim 1, wherein the first indication information comprises first SL DRX configuration release indication information, and the second communication device releases the SL DRX configuration for the first sidelink based on the first SL DRX configuration release indication information.

4. The method according to claim 1, wherein the first indication information comprises an identifier of a sidelink, an identifier of a single communication device, or an identifier of a communication device pair.

5. The method according to claim 1, wherein the first indication information comprises synchronization indication information, and the synchronization indication information requests to synchronously enable or disable the SL DRX configuration and a sidelink user equipment power saving signal (SL UPSS) configuration.

6. The communication method according to claim 1, wherein the first communication device determines the first indication information based on fourth service-related information, wherein the fourth service-related information is service-related information between the first communication device and the second communication device.

7. A communication method, comprising:
   receiving, by a first communication device, second auxiliary information sent by a second communication device, wherein de second auxiliary information comprises one or more of power percentage information, a power level, sufficient power indication information, power saving type information of a terminal device, sidelink discontinuous reception (SL DRX) adjustment value information with null content, indication information for enabling or disabling an SL DRX configuration, and resource configuration information that are of the second communication device;
   sending, by the first communication device, the second auxiliary information to a third communication device
   receiving, the first communication device, second indication information sent by the third communication device, wherein the second indication information requests an enabling operation for a first sidelink, the enabling operation comprises enabling an SL DRX configuration for the first sidelink, or disabling an SL DRX configuration for the first sidelink, and the first sidelink is a sidelink between the first communication device and the second communication device; and
   sending, by the first communication device, the second indication information to the second communication device.

8. The communication method according to claim 7, further comprising sending, by the first communication device, first service-related information to the third communication device, wherein the first service-related information is service-related information between the first communication device and the second communication device.

9. The communication method according to claim 8, wherein the first service-related information includes one or more of a service cycle, a service volume in a specific time period, or a service duration.

10. The communication method according to claim 8, wherein the first service-related information is carried in a DCI message, a MAC CE message, or an RRC message.

11. The communication method according to claim 8, further comprising receiving, by the first communication device, first service-related feedback indication information from the third communication device, where the first service-related feedback indication information indicates to send the first service-related information to the third communication device.

12. A communication method, comprising:
    determining, by a second communication device, service requirement information indicating whether the second communication device is to send a service or that the second communication device is not to send a service;
    when determining that the service is to be sent, determining, by the second communication device, to disable an SL DRX configuration for a first sidelink, wherein the first sidelink is a sidelink between a first communication device and the second communication device; and
    determining, by the second communication device, third indication information, wherein the third indication information indicates an enabling operation for the first sidelink, and the enabling operation comprises enabling the sidelink discontinuous reception (SL DRX) configuration for the first sidelink or disabling the SL DRX configuration for the first sidelink.

13. The communication method according to claim 12, further comprising obtaining or determining, by the second communication device, a resource through random selection in first t time units after determining that the service is to be sent, wherein t is an integer or a decimal greater than 0.

14. The communication method according to claim 13, further comprising starting sensing when obtaining or determining the resource through random selection in the first t time units, and/or determining to obtain or determine the resource based on a sensing result after the t time units end, wherein the sensing comprises full sensing or partial sensing.

15. The communication method according to claim 12, further comprising starting sensing when the second communication device determines that the service is to be sent.

16. The communication method according to claim 15, wherein before the second communication device obtains a sensing result, obtaining, by the second communication device, a resource in a random selection manner; and/or after the second communication device obtains the sensing result, obtaining or determining, by the second communication device, the resource based on the sensing result.

17. The communication method according to claim 12, further comprising sending, by the second communication device, the third indication information to the first communication device.

* * * * *